US010668490B2

(12) United States Patent
Hall et al.

(10) Patent No.: US 10,668,490 B2
(45) Date of Patent: Jun. 2, 2020

(54) WIRELESS ELECTRONIC SPRINKLER HEAD

(71) Applicants: David R. Hall, Provo, UT (US); Mark Hall, Springville, UT (US); Craig Boswell, Draper, UT (US); Sky Evans, Provo, UT (US); Joe Fox, Spanish Fork, UT (US); Jedediah Knight, Provo, UT (US)

(72) Inventors: David R. Hall, Provo, UT (US); Mark Hall, Springville, UT (US); Craig Boswell, Draper, UT (US); Sky Evans, Provo, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 438 days.

(21) Appl. No.: 15/239,151

(22) Filed: Aug. 17, 2016

(65) Prior Publication Data
US 2018/0050351 A1 Feb. 22, 2018

(51) Int. Cl.
| B05B 1/30 | (2006.01) |
|---|---|
| H04B 7/24 | (2006.01) |
| B05B 12/00 | (2018.01) |
| B05B 1/16 | (2006.01) |
| H02J 7/35 | (2006.01) |
| H02J 7/32 | (2006.01) |

(Continued)

(52) U.S. Cl.
CPC ............... *B05B 1/30* (2013.01); *B05B 1/3013* (2013.01); *B05B 3/022* (2013.01); *B05B 12/00* (2013.01); *H02J 7/32* (2013.01); *H02J 7/35* (2013.01); *H04B 7/24* (2013.01); *B05B 1/1645* (2013.01); *B05B 3/0481* (2013.01); *B05B 15/74* (2018.02)

(58) Field of Classification Search
CPC ......... B05B 15/70; B05B 15/74; B05B 12/00; B05B 1/3013; B05B 1/1645; B05B 3/022; B05B 3/0481; H02J 7/32; H02J 7/35; G05B 2219/2625; G05B 2219/25092
See application file for complete search history.

(56) References Cited

U.S. PATENT DOCUMENTS 3,589,616 A * 6/1971 Stephens ................. B05B 15/74
239/204
7,701,076 B2 * 4/2010 Baarman ................. C02F 1/325
290/54

(Continued)

*Primary Examiner* — Chee-Chong Lee
*Assistant Examiner* — Christopher R Dandridge

(57) ABSTRACT

A fluid dispersal node is disclosed that includes one or more fluid outlets, an electromechanical valve, one or more hardware processors, hardware memory, a hardware wireless communication module, an antenna, and a fluid-tight, substantially radio frequency (RF) transparent enclosure. The valve is disposed in the node, and controls fluid flow to the outlets. The processors, in turn, control the valve. The wireless module receives instructions for operating the valve and forwards those instructions to one or more of the processors and the memory. The processors, memory, wireless module and antenna are disposed within the RF-transparent housing. In some embodiments, the antenna is disposed on a riser associated with the node outside the enclosure. In other embodiments, the antenna is disposed in a fluid line connected to the node.

12 Claims, 20 Drawing Sheets

(51) Int. Cl.
*B05B 3/02* (2006.01)
*B05B 3/04* (2006.01)
*B05B 15/74* (2018.01)

(56) References Cited

U.S. PATENT DOCUMENTS

| | | | |
|---|---|---|---|
| 2006/0071098 A1* | 4/2006 | McCormick | B05B 1/3402 239/504 |
| 2015/0319942 A1* | 11/2015 | Thomas | A01G 25/16 239/1 |
| 2015/0351337 A1* | 12/2015 | Sabadin | A01G 25/16 700/282 |

* cited by examiner

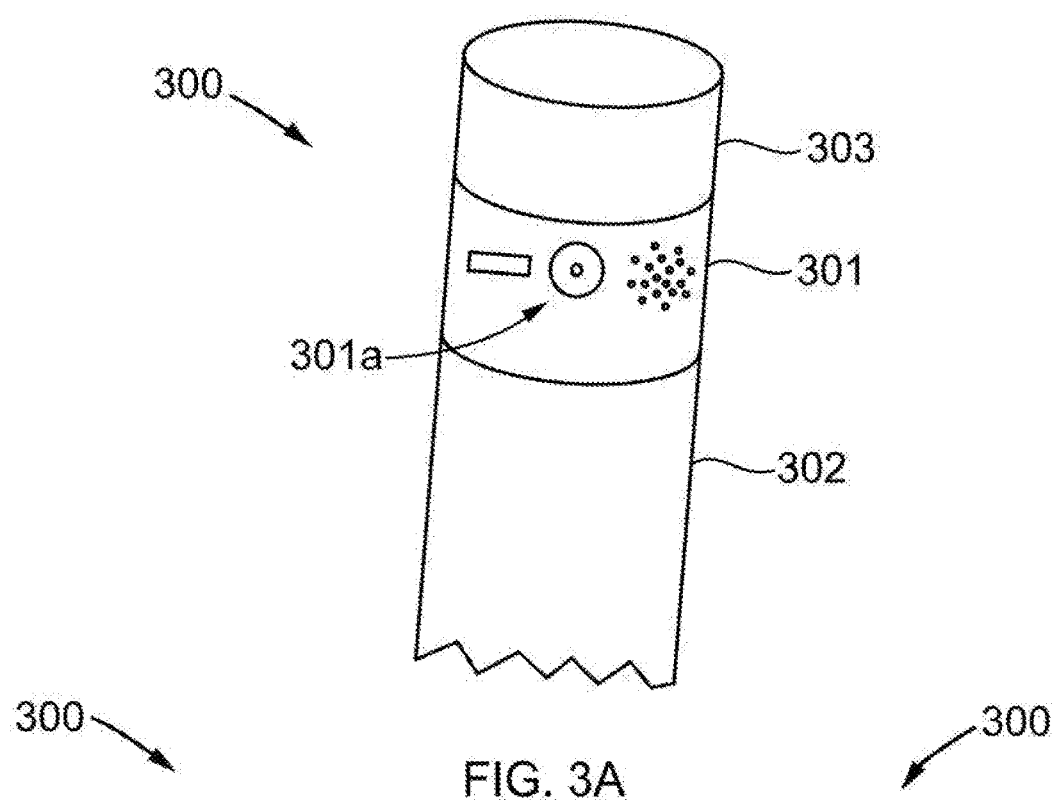
FIG. 3A
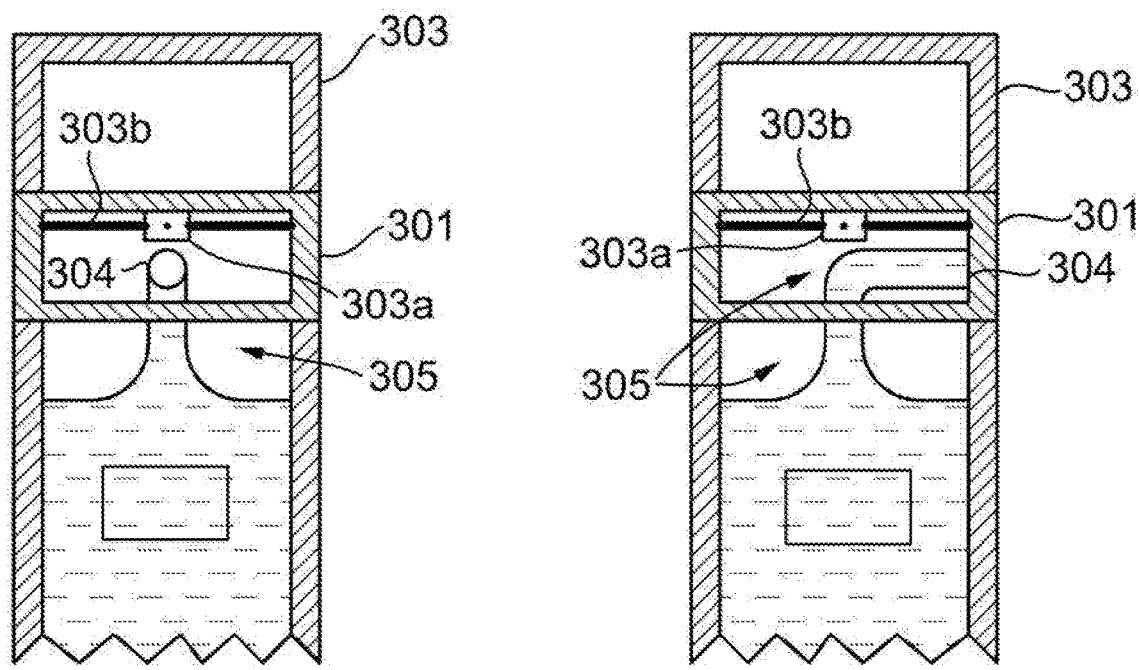
FIG. 3B
FIG. 3C

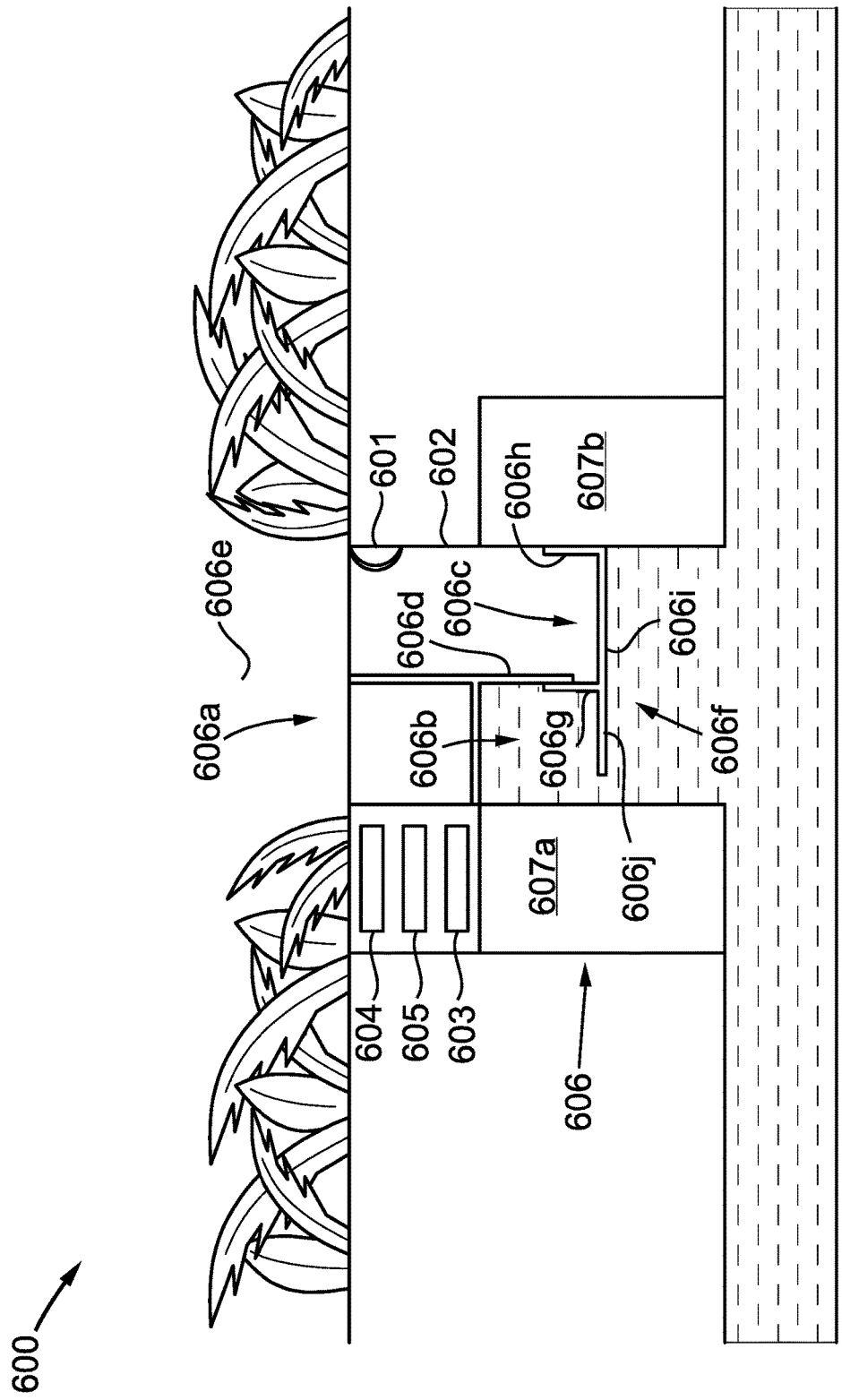

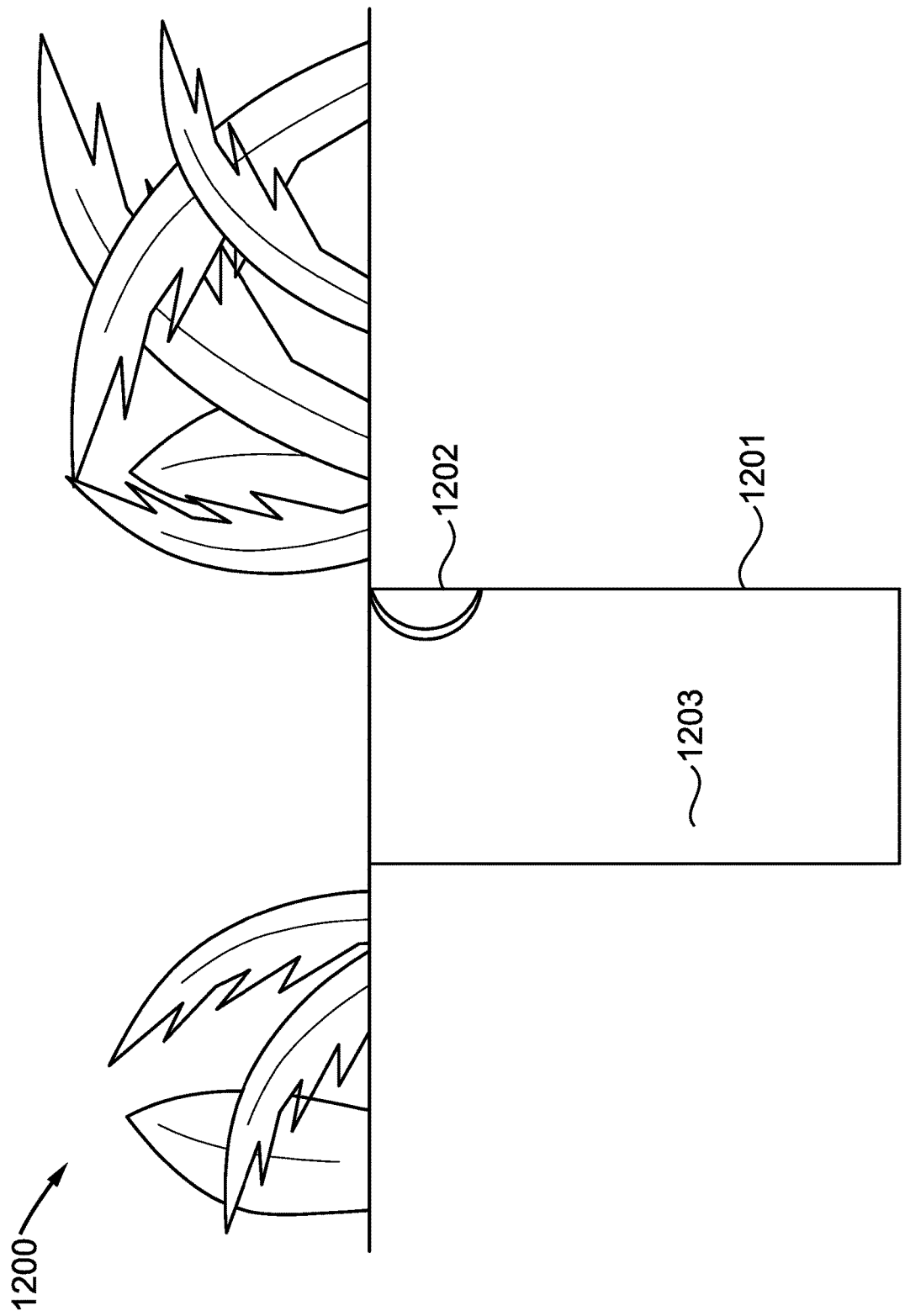

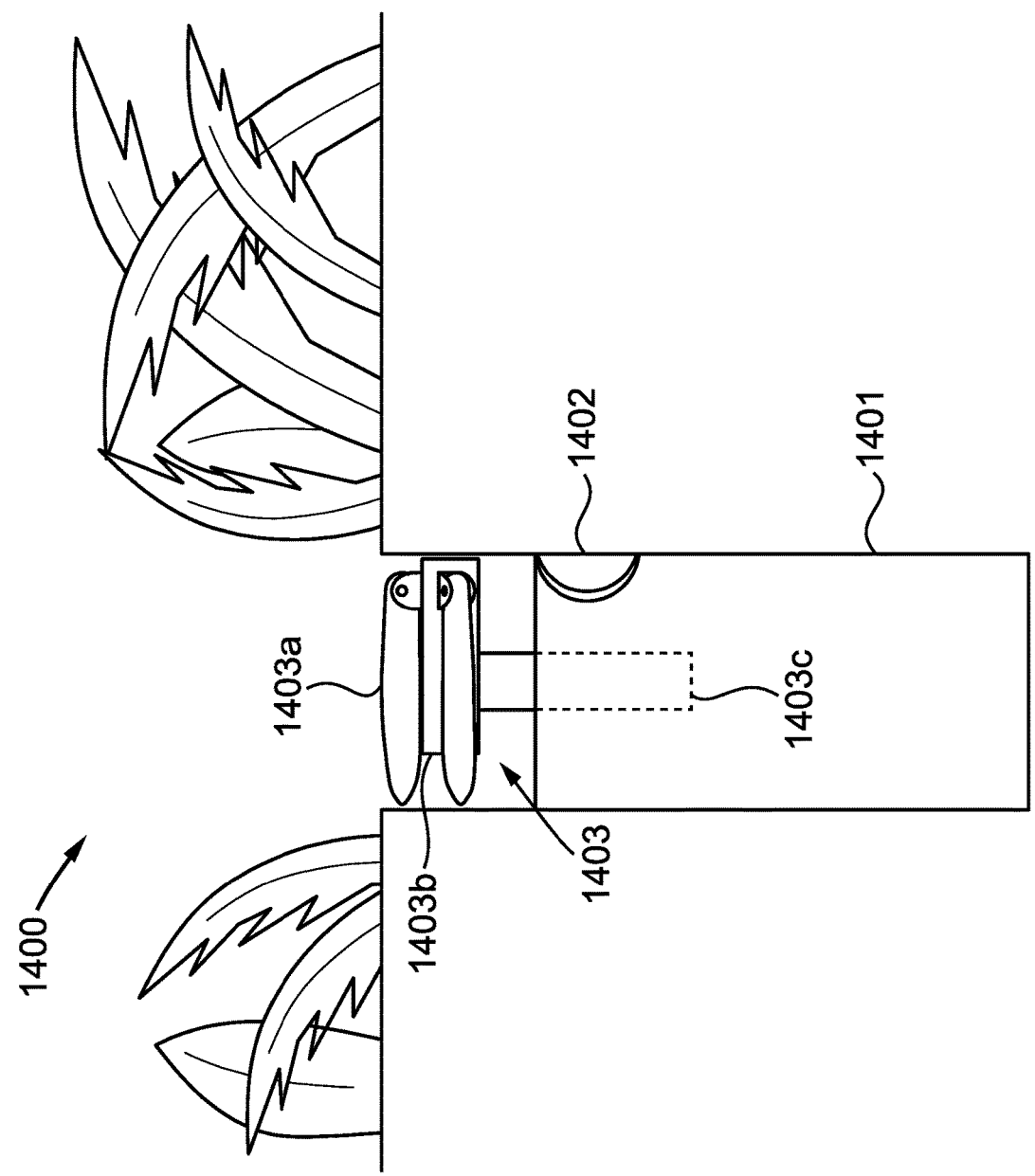

WIRELESS ELECTRONIC SPRINKLER HEAD

TECHNICAL FIELD

This invention relates generally to the field of the Internet of Things (IoT), and more specifically to wireless fluid dispersal systems.

BACKGROUND

Many current fluid dispersal systems, such as irrigation systems and fire sprinkler systems, are a made up of control boxes that are wired to master valves, each valve controlling water flow to a zone that includes several fluid dispersal nodes. Unfortunately, in many cases, simple zone control is an inadequate solution for fluid dispersion. For example, in many irrigation systems, any zone with a significant mix of shaded and sunny areas and/or significant variations in terrain and/or vegetation will have areas that are either over watered or under watered. Additionally, cost and complexity rise sharply with the number of zones added. The newest digital controls are more flexible when it comes to timing but are still limited by the need for dedicated mechanical switching of groups of heads in zones. Connectivity and power problems are also more significant for newer systems.

SUMMARY OF THE INVENTION

A fluid dispersal node is described herein that overcomes the limitations described above. In general, the node includes a fluid outlet, a valve disposed in the node, and electronics for controlling the valve and communicating wirelessly. When deployed in a fluid dispersal system, the node overcomes the problems described above by creating a completely flexible system where each node is individually controllable, and by addressing connectivity and power problems to achieve a fully robust wireless fluid dispersal system.

In one embodiment, the fluid dispersal node includes one or more fluid outlets, an electromechanical valve, one or more hardware processors, hardware memory, a hardware wireless communication module, an antenna, and a fluid-tight, substantially radio frequency (RF) transparent enclosure. The valve is disposed in the node, and controls fluid flow to the outlets. The processors, in turn, control the valve. The wireless module receives instructions for operating the valve and forwards those instructions to one or more of the processors and the memory. The processors, memory, wireless module and antenna are disposed within the RF-transparent housing.

In another embodiment, the fluid dispersal node includes a riser, a nozzle, an electromechanical valve, one or more hardware processors, hardware memory, an antenna, and a hardware wireless communication module. The nozzle is disposed on the riser. The valve is disposed in the node and controls fluid flow to the nozzle. The processors control the valve. The antenna is disposed on the riser and is coupled to the wireless module. The wireless module receives instructions for operating the valve and forwards those instructions to one or more of the processors and the memory.

In yet another embodiment, the fluid dispersal node includes one or more fluid outlets, an electromechanical valve, one or more hardware processors, hardware memory, a hardware wireless communication module, and an antenna. The valve is disposed in the node and controls fluid flow to the outlets. The processors control the valve. The wireless module receives instructions for operating the valve and forwards those instructions to one or more of the processors and the memory. The antenna is disposed in a fluid line associated with the fluid dispersal node and is electrically coupled to the wireless module.

BRIEF DESCRIPTION OF THE DRAWINGS

A more particular description of the invention briefly described above is made below by reference to specific embodiments. Several embodiments are depicted in drawings included with this application, in which:

FIGS. 3A-C depict various views of a sprinkler head having a plurality of nozzle shapes, according to the claimed invention;

FIGS. 6A-B depict two views of an electromechanical valve according to the claimed invention;

FIGS. 12A-C depict an embodiment of a fluid dispersal node having an antenna disposed in a node riser;

FIGS. 14A-B depict an embodiment of a fluid dispersal node similar to that depicted in FIG. 13, instead including a miniature wind turbine.

DETAILED DESCRIPTION

A detailed description of the claimed invention is provided below by example, with reference to the embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and are not intended to limit the described elements to only the features described with regard to the other embodiments. Rather, each embodiment is distinct from each other embodiment, unless expressly stated otherwise.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
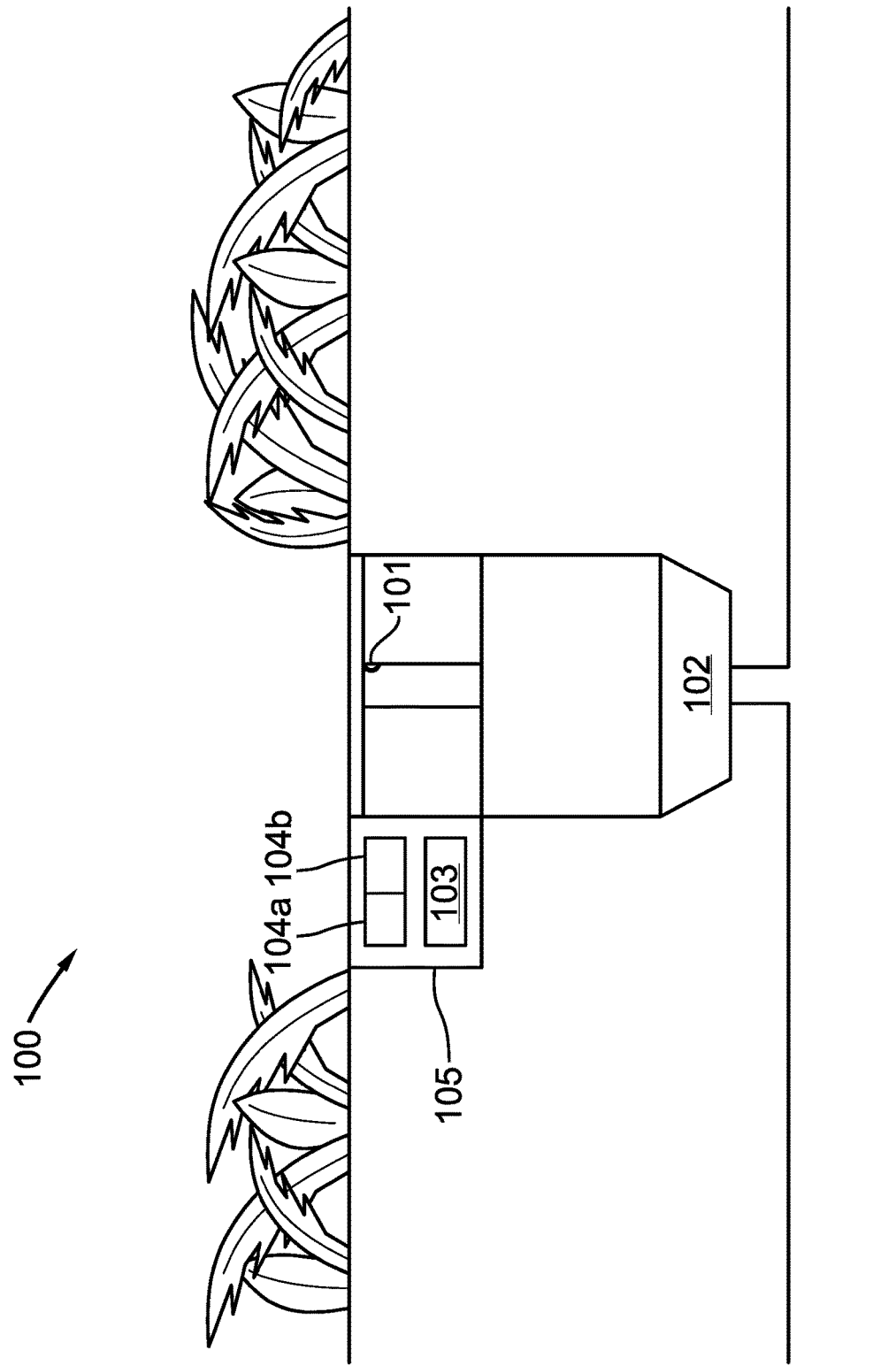
FIG. 1 depicts one embodiment of a fluid dispersal node according to the claimed invention.

FIG. 1 depicts one embodiment of a fluid dispersal node according to the claimed invention. Node 100 includes fluid outlet 101, electromechanical valve 102, hardware controller 103, hardware wireless communication module 104a, antenna 104b, and fluid-tight, RF-transparent enclosure 105. As shown, valve 102 is disposed in node 100, and controls fluid flow to outlet 101. Controller 103 controls valve 102, and wireless module 104a receives, via antenna 104b, instructions for operating valve 102 and forwards those instructions to controller 103. Enclosure 105 is substantially RF-transparent (described in more detail below), and controller 103, wireless module 104a and antenna 104b are disposed within enclosure 105.

Node 100 is any of a variety of fluid dispersal nodes. For example, as in the depicted embodiment, in some embodiments, node 100 is an irrigation node such as a sprinkler head. In other embodiments, node 100 is deployed in a fire sprinkler system. In yet other embodiments, node 100 is part of a water entertainment feature, such as a fountain or amusement park. Again, in yet other embodiments, node 100 is part of a water cooling system, such as a misting system and/or a pool aeration system. Though many embodiments of node 100 are applicable to water-based systems, node 100 is function for a variety of fluid dispersal systems. Those of skill in fluid dispersal systems recognize other settings and embodiments of node 100 that meet the description provided herein. For example, in some fire sprinkler systems, a foam or powder is dispersed instead of water. Some systems disperse vapor, such as fogging systems. Node 100 is useful in such applications, as well. In some embodiments, node 100 is useful in mixing liquids, such as liquids in a juice and/or soda dispenser. If one really desired, node 100 is useful to spray Kool-Aid, such as for an attraction at a child's birthday party, where the children run joyously through the Kool-Aid spray. Node 100 is also useful to spray the children with some form of liquid cleaner after the Kool-Aid drenching.

Fluid outlet 101 is any of a variety of outlets that meet the purposes of node 100 described above. In some embodiments, fluid outlet 100 is a spray nozzle, and includes a flow constrictor and spreader. In other embodiments, fluid outlet 100 emits a continuous stream of fluid. In yet other embodiments, fluid outlet 100 is one or more of a flooder, a bubbler, a soaker hose, a rocker sprinkler nozzle, and a multi-stream nozzle.

Valve 102 is any of a variety of electromechanical valves. In some embodiments, valve 102 includes a solenoid and multiple chambers, where a pressure gradient caused by the solenoid actuating switches valve 102. In other embodiments, valve 102 includes permanent magnets, ferromagnets, electromagnets, or combinations thereof that open and close valve 102. In some embodiments, valve 102 is adjustable, such that an amount of water flowing through valve 102 when valve 102 is open is variable.

Controller 103 includes one or more hardware processors and hardware memory. The memory stores computer readable instructions that cause the processor to operate valve 102 and/or wireless module 104a. In some embodiments, controller 103 is a microcontroller. As used herein, "microcontroller" refers to any combination of memory and processors suitable for the system and methods described herein. For example, in one embodiment, the microcontroller is a 256 kb-RAM microcontroller. In another embodiment, the microcontroller is a 64 kb-RAM microcontroller. In yet other embodiments, the memory and processors are networked on a PCB, where the memory has megabytes to terabytes of memory, and where the processors include processing speeds of 1 MHz to 16 GHz.

The memory is, for example (but not limited to), any of a variety of hardware storage media, such as an electronic storage device, a magnetic storage device, an optical storage device, an electromagnetic storage device, a semiconductor storage device, a chemical memory storage device, a quantum state storage device, or any suitable combination of the foregoing. Memory, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable instructions for carrying out operations of the present invention include, but are not limited to, assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer readable instructions for implementing the invention are also, in some embodiments, written in a low-level programming language such as assembly language. In some embodiments, electronic circuitry including, for example, programmable logic circuitry, field-programmable gate arrays (FPGA), or programmable logic arras (PLA), execute the computer readable instructions by utilizing state information of the computer readable program instructions to customize the electronic circuitry.

Wireless module 104a is any of a variety of wireless modules, such as transmitters, receivers, transmitter-receivers, and transceivers. Such devices include (but are not limited to) Wifi, Bluetooth, Zigbee, and/or LoRa (a 900 MHz spread spectrum transceiver) transceivers, among others. In one specific embodiment, wireless module 104a is a LoRa transceiver programmed to communicate on the 902-928 MHz ISM band. In such an embodiment, signals communicated by wireless module 104a are spread to 500 kHz, and are frequency-hopped, having a data speed of approximately 1,172 bit/sec. Under such conditions, and with a spreading factor of 12, wireless module 104a has a sensitivity of −134 dB, and can hear a 1-watt signal at a 1-mile range under typical urban conditions, and a range exceeding 20 miles in rural and/or line-of-sight conditions. Typical urban conditions include other wireless traffic, trees and tall buildings, and elevation changes.

In other embodiments, other wireless settings are preferred. In general, wireless module 104a communicates spread spectrum signals, with bandwidths ranging from 7 to 500 kHz, and spreading factors ranging from 1-18. The signals are transmitted at a power ranging from 0 to 1 W. The various embodiments include incremental bandwidths of 7.8 kHz, 10.4 kHz, 15.6 kHz, 20.8 kHz, 31.25 kHz, 41.7 kHz, 62.5 kHz, 125 kHz, 250 kHz, and 500 kHz. Data rates range from 100 bit/sec to 500 kbit/sec, where range is exchanged for speed. Thus, in embodiments where a high amount of data is communicated with node 100, and the communication must occur rapidly, node 100 must be close to the device it is communicating with. However, in embodiments where node 100 simply requires an on/off signal, the range extends to tens of miles.

Antenna 104b is any of a variety of antennas specialized for, and corresponding to, wireless module 104a. Such antennas include (but are not limited to) those designed for Wifi, Bluetooth, Zigbee and/or LoRa systems, among others.

Enclosure 105 is fluid-tight. As used throughout the description and claims, fluid-tight means that fluid which enclosure 105 is designed to keep out cannot pass through any of enclosure's 105 surfaces and/or joints. In other words, under temperature and pressure conditions typical for a particular system, fluid outside enclosure 105 cannot penetrate into enclosure 105. However, as one of skill in the art recognizes, fluid vapor is generally capable of passing through fluid-tight barriers. Thus, fluid-tight is not to be construed to mean that all fluid vapor is also excluded. In addition to being fluid-tight, enclosure 105 is RF-transparent, and includes any of a variety of RF-transparent materials. As used throughout the description and claims, RF-transparent relates to a material's dissipation factor, where materials with lower dissipation factors attenuate RF signals passing through those materials less than materials with higher dissipation factors. In some embodiments, suitable materials have dissipation factors less than or equal to 0.005. However, in optimal embodiments, enclosure 105 has a dissipation factor ranging from approximately 0.001 to approximately 0.0001. In such embodiments, enclosure 105 includes uncured butyl rubber, aluminum oxide, magnesium oxide, beryllium oxide, cross-linked polystyrene, polyethylene, polypropylene, Teflon, fused quartz, fused silica, boron nitride, or combinations thereof.

In one embodiment, enclosure 105 is formed completely out of Teflon, which has a dissipation factor of between 0.0001 and 0.0002. Teflon also has the added benefit of being hydrophobic. In some embodiments, enclosure 105 includes a hygroscopic material inside enclosure 105. The hygroscopic material, which in most embodiments has a significantly higher dissipation factor than the material making up enclosure 105, lines an inside surface of enclosure 105 on a side of enclosure 105 that is unlikely to receive wireless signals. Including the hygroscopic material decreases the likelihood of fluid damage to electrical components inside enclosure 104 from fluid vapors that seep into enclosure 105. Although not depicted, in some embodiments, enclosure 105 houses all or part of electrical components of valve 102.

Though not depicted in the present embodiment, node 100 includes any of a variety of energy-storage and/or power mechanisms that power the electrical components. Further depiction of such mechanisms is described with regard to FIGS. 4A-B, 5, 13, and 14A-B.

Node 100 operates similar to many typical and/or specialized fluid dispersion nodes, except that node 100 is controlled wirelessly, without the need for manual adjustment. Wireless module 104a receives instructions from a user and communicates those instructions to controller 103. A user communicates with node 100 either directly via a wireless user device, such as a smartphone and/or tablet, or through a control hub. The control hub (not depicted, but as shown in FIG. 22) receives input either directly from a user, via a wireless connection to a user device, and/or via a cloud connection. The instructions communicated to node 100 includes instructions to open and/or close valve 102, measure soil conditions, measure a water flow rate and/or volume, and/or reset a scheduled operation time, among others. For example, in one embodiment, a user turns on node 100 at his home from work using a smartphone. In some embodiments, controller 103 transmits information back to the control hub and/or user. For example, in one such embodiment, a user receives a notification that a zone near node 100 is especially dry, and prompts the user to change the watering schedule and/or to turn on node 100.

A primary benefit of enclosure 105 is to ensure minimal signal loss while still protecting electrical components from fluid damage. Because non-conventional materials are used, wireless communication with node 100 is capable over, in some embodiments, tens of miles. For example, in one embodiment, node 100 is a fire sprinkler in a commercial building of several stories and several tens- and even hundreds-of thousands of square feet. Because node 100 is equipped with wireless module 104a and is protected by RF-transparent enclosure 105, a single control hub located anywhere in the building controls all nodes 100 placed around the building, without the need for wiring and/or additional control hubs. In another embodiment, node 100 is a lawn sprinkler in an irrigation system. Again, because node 100 is equipped with wireless module 104a and is protected by RF-transparent enclosure 105, a single control hub can control all nodes 100 across tens, even hundreds, of acres of property, again located anywhere on the property. In some embodiments, nodes 100 are placed across thousands, and even tens of thousands, of acres, and are responsive to signals from a single, centrally-located hub. In such long-range cases, a clear line-of-sight is also established to ensure communication.

Figure 2:
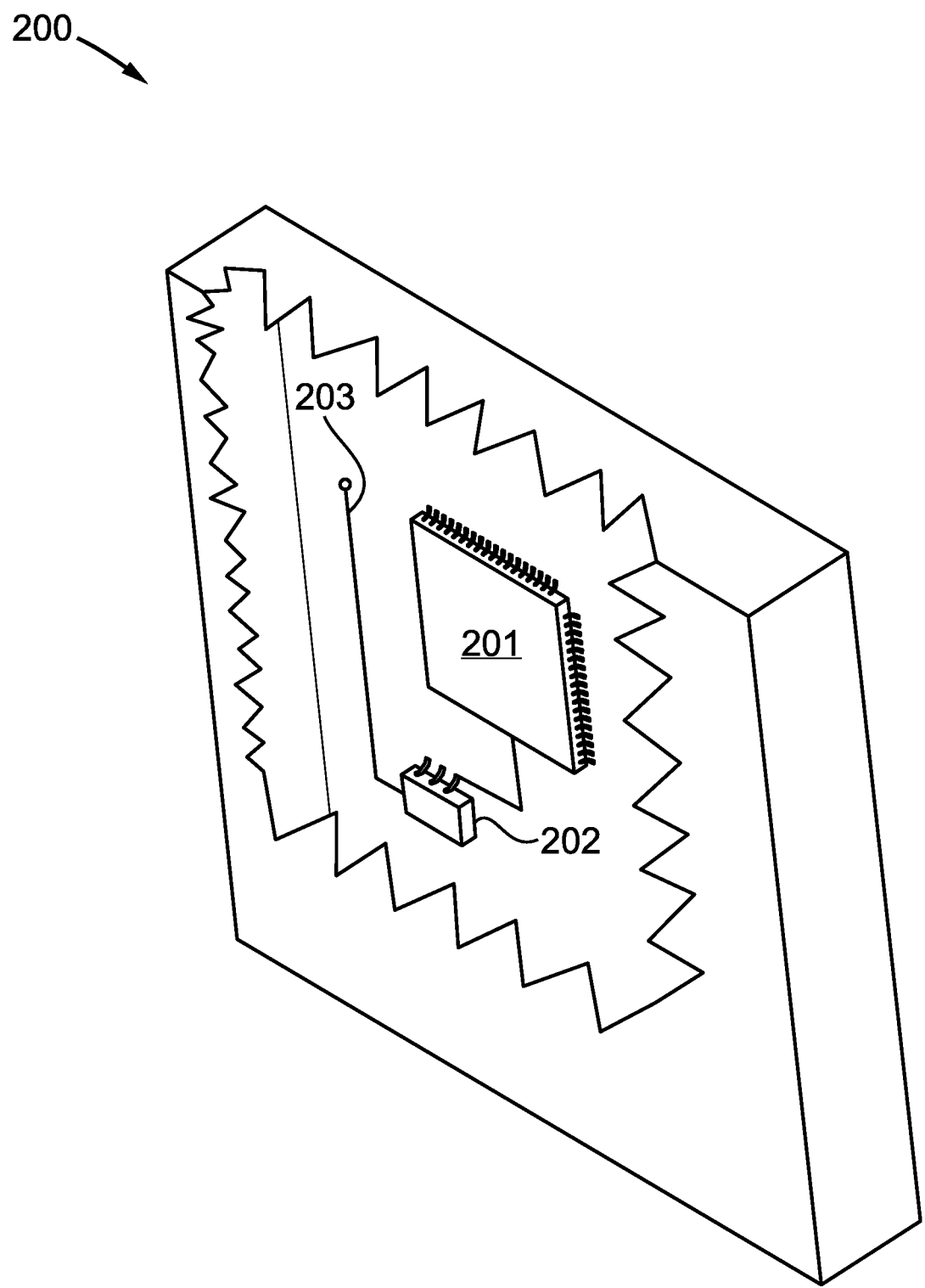
FIG. 2 depicts a cut-away isometric view of an electrical components enclosure according to the claimed invention.

FIG. 2 depicts a cut-away isometric view of an electrical components enclosure according to the claimed invention. As shown, enclosure 200 houses controller 201, hardware wireless communication module 202, and antenna 203.

FIGS. 3A-C depict various views of a sprinkler head having a plurality of nozzle shapes, according to the claimed invention. All embodiments of the claimed invention include at least one fluid outlet, or nozzle. However, some embodiments include more than one nozzle. In such embodiments, a means is required for selecting between the different nozzles. Accordingly, as depicted in FIGS. 3A-C, Sprinkler head 300 includes nozzle 301 disposed on riser 302 and having a plurality of nozzle shapes 301a. Motor 303 rotates nozzle 301, selecting one of the plurality of nozzle shapes 301a by directing the selected nozzle shape 301a over outlet 304, through which fluid flows. Outlet 304 is formed through flow constrictor 305, which additionally couples motor 303 to riser 302 via motor arm 303a. Splines 303b couple motor arm 303a to nozzle 301.

Though not depicted, sprinkler head 300 includes features similar to those described above with regard to FIGS. 1-2, including a controller, wireless module, antenna and electromechanical valve. The controller controls motor 303 in selecting and directing nozzle shapes 301a. The valve, which is also controlled by the controller, controls water flow to nozzle 301 via water outlet 304. A water-tight, RF-transparent enclosure, similar to those described above with regard to FIGS. 1-2, is also included, and houses some or all of the electrical components.

Figure 4A:
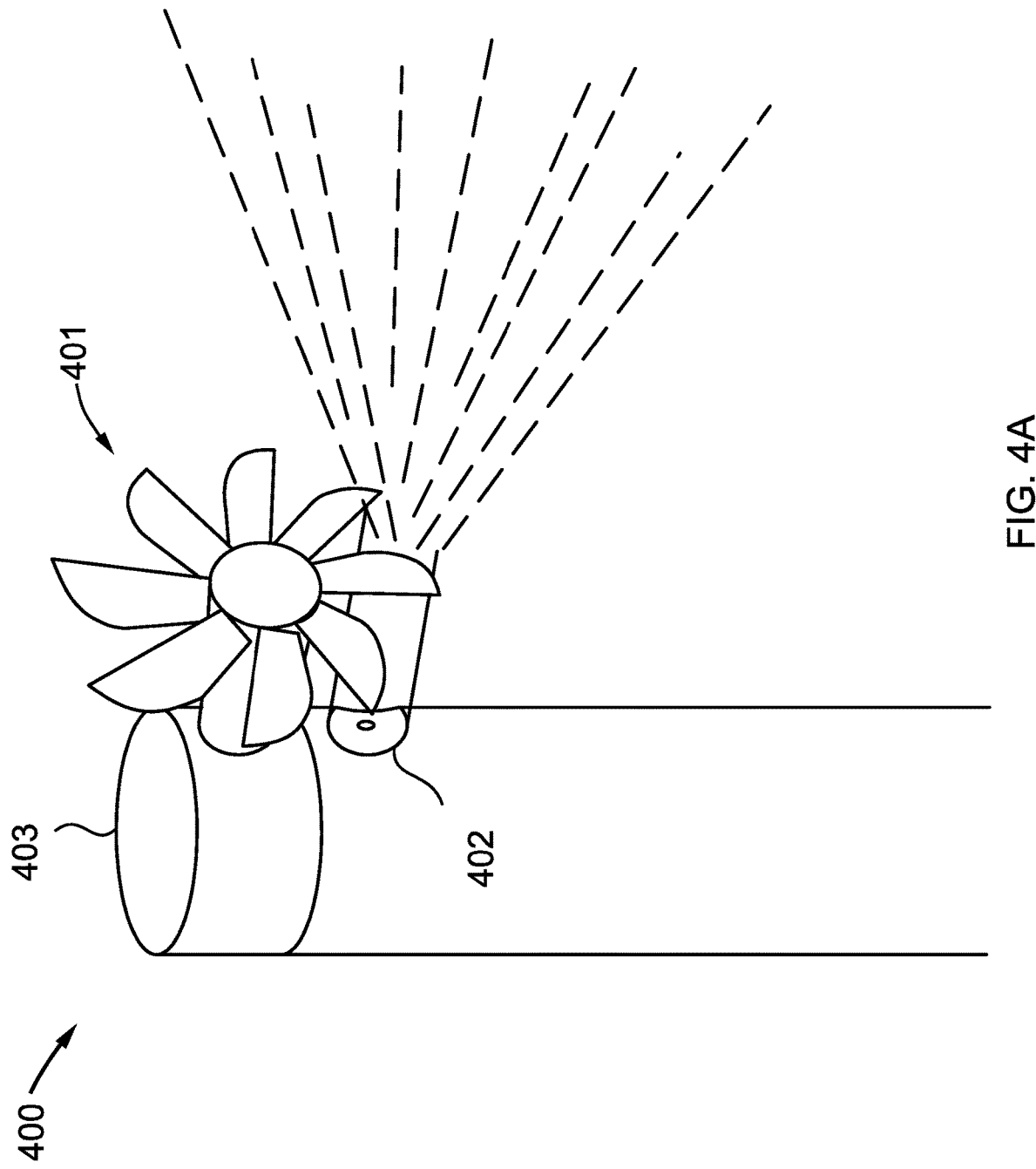
FIGS. 4A-B depict various views of a turbine-powered fluid dispersal node according to the claimed invention.
Figure 4B:
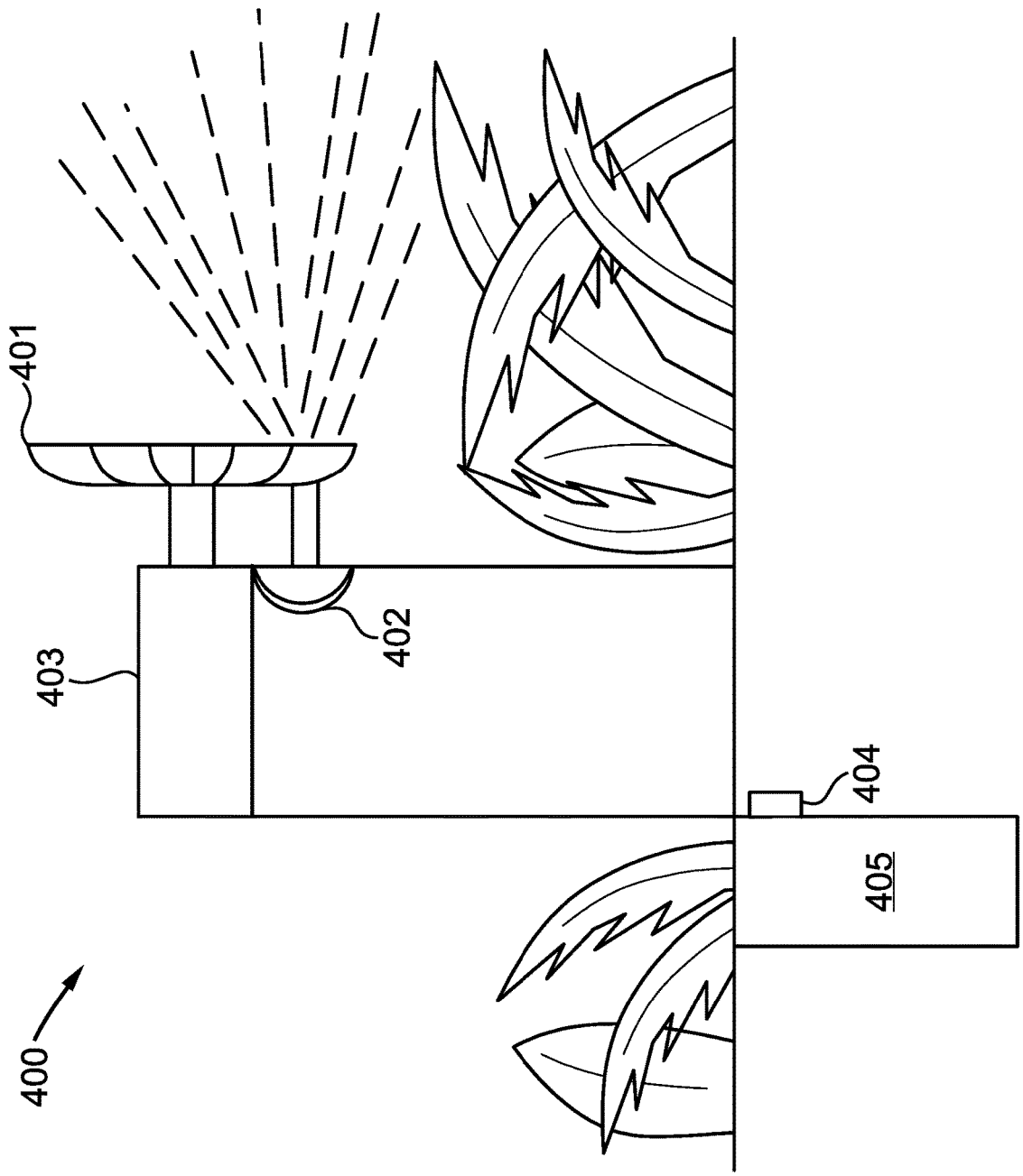

FIGS. 4A-B depict various views of a turbine-powered fluid dispersal node according to the claimed invention. Node 400 includes turbine 401 positioned in front of nozzle 402 and coupled to coil and magnet mechanism 403. As fluid flows from nozzle 402, the fluid causes turbine 401 to rotate, and is additionally spread by turbine 401, fulfilling two purposes. First, the rotating of turbine 401 creates a current through mechanism 403, and charges battery 404, which powers one or more of electronics 405 (including, for example, a controller and a hardware wireless communication module) and an electromechanical valve (not depicted, but similar to that described with regard to FIG. 1 above and FIGS. 6A-8E below). Controller and wireless module 405 are similar to those described above with regard to FIGS. 1-2.

Figure 5:
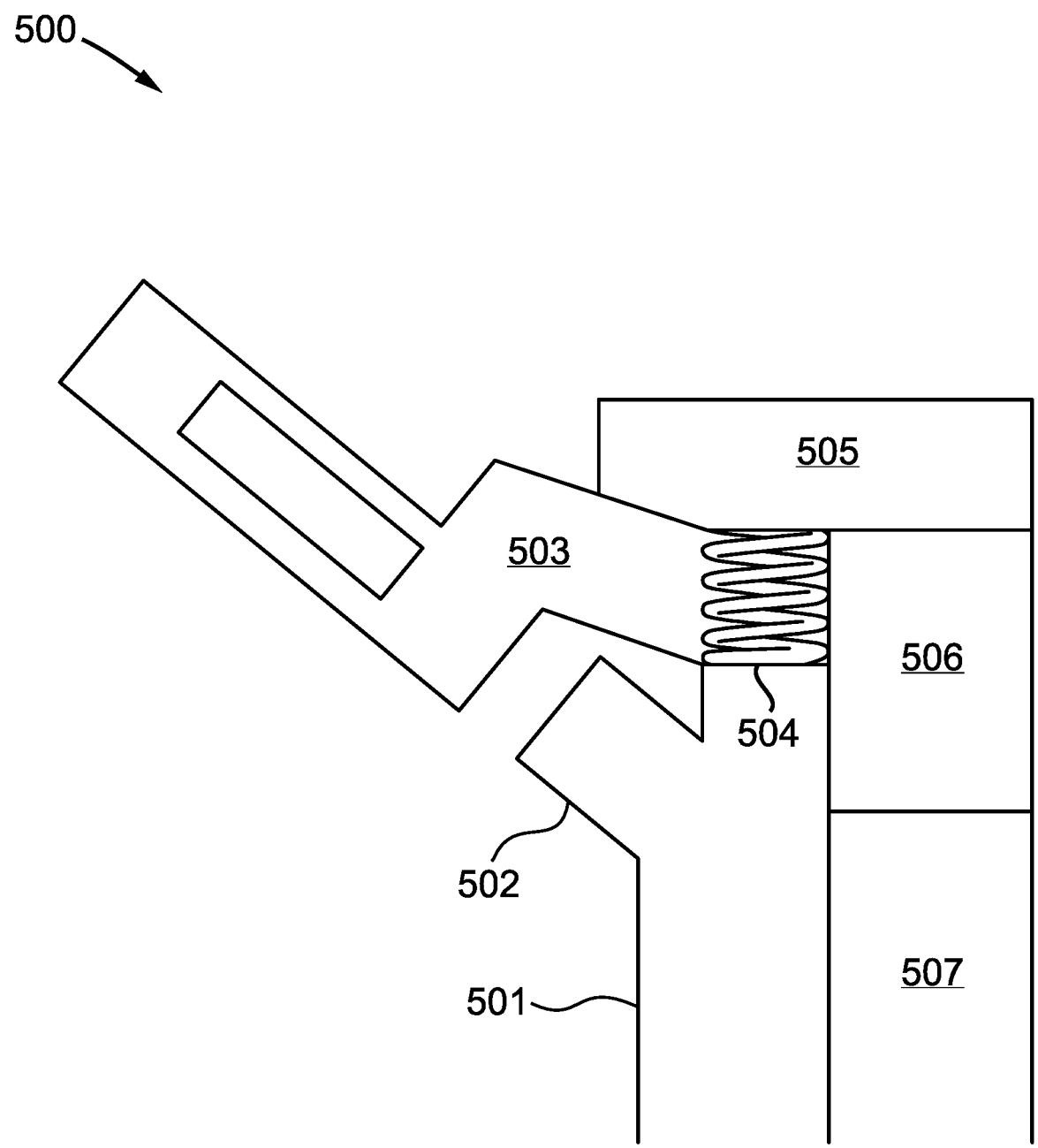
FIG. 5 depicts an example embodiment of a node as an impact rotor sprinkler head, according to the claimed invention.

FIG. 5 depicts an example embodiment of a node as an impact rotor sprinkler head. Sprinkler head 500 includes riser 501, nozzle 502, impact arm 503, spring 504, electromagnet 505, AC to DC power converter 506, and battery 507. As water flows out of nozzle 502, impact arm 503 is forced out of the flow, rotating electromagnet 505. Spring 504, in turn, drives impact arm 503 back over the flow from nozzle 502, rotating impact arm 503 and electromagnet 505 in the opposite direction. In this manner, impact arm 503 drives electromagnet 505 and generates an AC current. Power converter 506 converts the current to DC current, which charges battery 507. Similar to the embodiment described above with regard to FIGS. 4A-B, battery 507 powers various electrical components of node 500, including an electromagnetic valve, a hardware wireless communication module, and a controller (all similar to those described above with regard to FIGS. 1-2). In some embodiments, current directly from electromagnet 505 or directly from power converter 506 powers the electrical components.

Figure 6B:
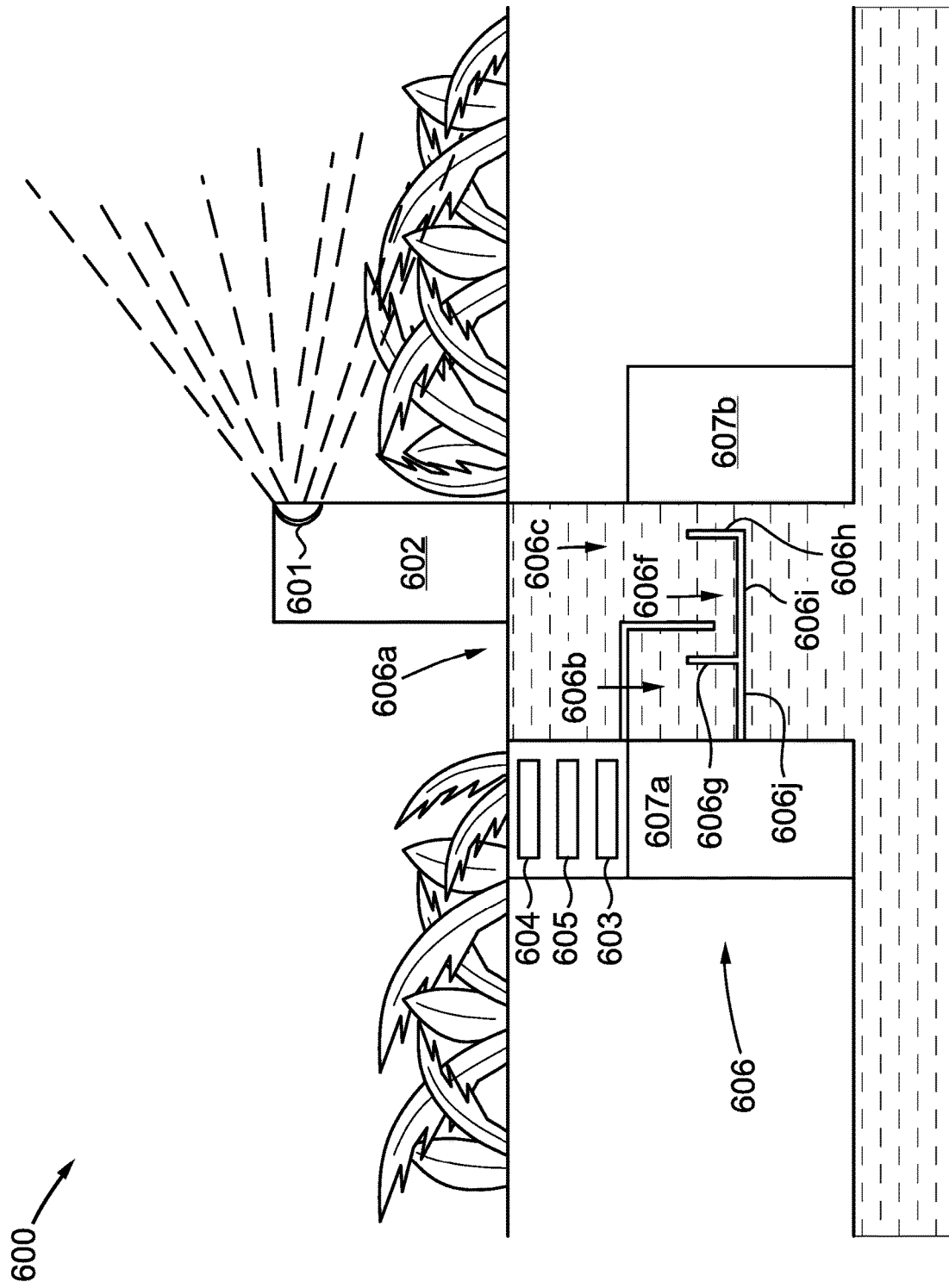

FIGS. 6A-B depict two views of an electromechanical valve according to the claimed invention. In general, because of localized control, nodes in accordance with the present invention can take advantage of electromagnets, permanent magnets and ferromagnets, typically used in switches, in directly actuating fluid valves. Thus, in some embodiments, an electromechanical valve included in a node according to the claimed invention includes one or more electromagnets and one or more permanent magnets, one or more ferromagnets, or combinations thereof. Node 600 is one such embodiment. Node 600 includes fluid outlet 601 disposed on riser 602, controller 603, hardware wireless communication module and antenna 604, battery 605, and electromechanical valve 606. In general, valve 606 includes hollow cylindrical pipe 606a having first chamber 606b, second chamber 606c, and partial wall 606d. Partial wall 606d partially separates first chamber 606b and second chamber 606c, and is parallel to axis 606e along the hollow center of pipe 606a. Valve 606 further includes u-shaped disk 606f, which is positioned around partial wall 606d within first chamber 606b and second chamber 606c. Disk 606f includes first side wall 606g, which is positioned in first chamber 606b parallel to partial wall 606d, and second side wall 606h, which is positioned in second chamber 606c parallel to partial wall 606d. Disk 606f further includes bottom wall 606i between first side wall 606g and second side wall 606h, and perpendicular to partial wall 606d. Bottom wall 606i has a length less than an internal diameter of pipe 606a and a width greater than or equal to the internal diameter of pipe 606a, such that a force exerted by bottom wall 606i on pipe 606a fixes disk 606f in pipe 606a, and such that bottom wall 606i is in fluid-tight contact with an interior wall of pipe 606a (not visible in the depicted embodiment, but as depicted in, and described below with regard to FIG. 7). Additionally, disk 606f includes protrusion 606j extending from first side wall 606g perpendicular to partial wall 606d. Protrusion 606j has a width less than the internal diameter of pipe 606a and a length extending from first side wall 606g that, when combined with the length of bottom wall 606i, is less than the internal diameter of pipe 606a.

As valve 606 is closed, first side wall 606g is in fluid-tight contact with partial wall 606d, and second side wall 606h is in fluid tight contact with the interior wall of pipe 606a. In such a state, because bottom wall 606i is also in fluid-tight contact with the interior wall, and because the combined length of bottom wall 606i and protrusion 606j is less than the internal diameter, fluid fills first chamber 606b and helps force first side wall 606g and second side wall 606h against partial wall 606d and the interior wall, respectively. As valve 606 is opened, protrusion 606j is in contact with the interior wall, and fluid is allowed to flow around disk 606f, into second chamber 606c, forcing riser 602 up, and flowing through fluid outlet 601.

Valve 606 is switched between closed, as depicted in FIG. 6A, and opened, as depicted in FIG. 6B, by electromagnets 607a,b and permanent and/or ferromagnets disposed in disk 606f (not depicted, but as depicted in, and described with regard to, FIGS. 8A-E below). Electromagnets 607a,b are disposed on either side of pipe 606a, and are aligned with the magnets disposed in disk 606f. To close valve 606, electromagnet 607b is turned on, which creates a magnetic field that aligns with the magnet closest to it, and causes disk 606f to slide in pipe 606a towards electromagnet 607b. Electromagnet 607b is then, in some embodiments, switched off, and fluid pressure in first chamber 606b forces valve 606 closed so that electromagnet 607b does not need to be active to keep valve 606 closed. To open valve 606, electromagnet 607a is turned on, creating a magnetic field that aligns with the permanent magnet closest to it, and causing disk 606f to slide in pipe 606a towards electromagnet 607a. When valve 606 is open, fluid pressure around disk 606f is at equilibrium, and electromagnet 607a does not need to be active to keep valve 606 open. However, in some embodiments, it is useful to keep electromagnet 607a active to apply a force to keep valve 606 open in case of pressure waves traveling through the fluid that move disk 606f. In such embodiments, the current run through electromagnet 607a is equal to or less than the current used to open valve 606, depending on the anticipated strength of pressure waves in node 600.

Figure 7:
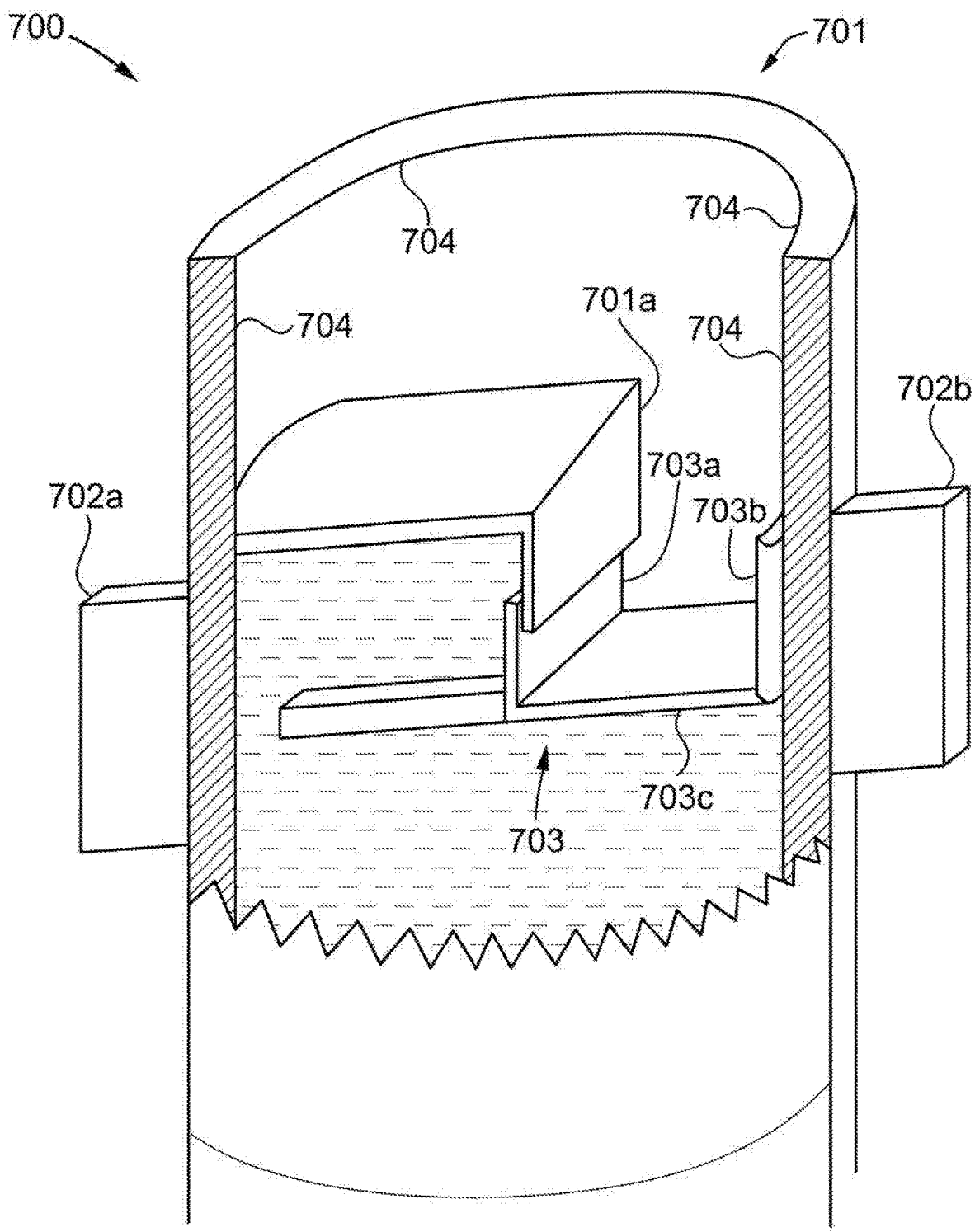
FIG. 7 depicts a cross-sectional, isometric view of an electromagnetic valve in accordance with the claimed invention.

FIG. 7 depicts a cross-sectional, isometric view of an electromagnetic valve in accordance with the claimed invention. Valve 700 includes pipe 701, electromagnets 702a,b, disk 703, and interior wall 704. As depicted, disk 703 is in fluid-tight contact with interior wall 704 at sidewalls 703a,b and bottom wall 703c. Partial wall 701a also extends an entire internal diameter of pipe 701. As valve 700 is closed, partial wall 701a, sidewalls 703a,b, and bottom wall 703c form a fluid-tight seal with interior wall 704. As valve 700 is opened, fluid flows around disk 703 and up pipe 701.

Figure 8A:
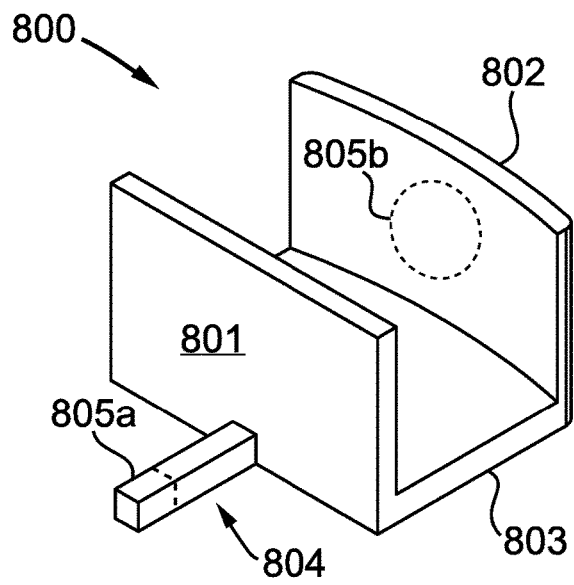
FIGS. 8A-E depict several views of a valve disk for use in an electromagnetic valve according to the claimed invention.

FIGS. 8A-E depict several views of a valve disk for use in an electromagnetic valve according to the claimed invention. FIG. 8A is an isometric view of disk 800. Disk 800 includes first side wall 801, second side wall 802, bottom wall 803, protrusion 804, and magnets 805a,b. Magnet 805a is disposed in protrusion 804, and magnet 805b is disposed in second side wall 802. Though in the depicted embodiment, magnets 805a,b form only a portion of protrusion 804 and second side wall 802, in some embodiments, protrusion 804 and second side wall 802 are permanent magnets. In other embodiments, bottom wall 803 and protrusion 804 includes permanent magnets 805a,b. In yet other embodiments, disk 800 is made of a strongly ferromagnetic material such as iron, nickel, cobalt gadolinium, dysprosium, samarium and/or neodymium. In yet other embodiments, only protrusion 804 and side wall 802 are ferromagnetic. In general, magnets 805 a,b are permanent magnets, ferromagnets, or combinations thereof.

Figure 8B:
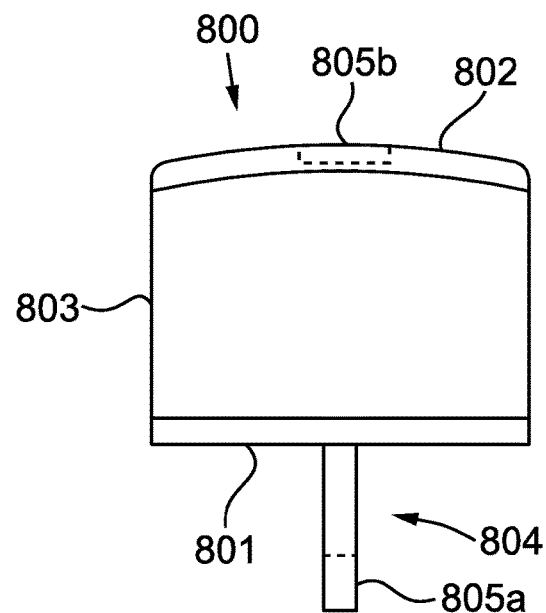
Figure 8C:
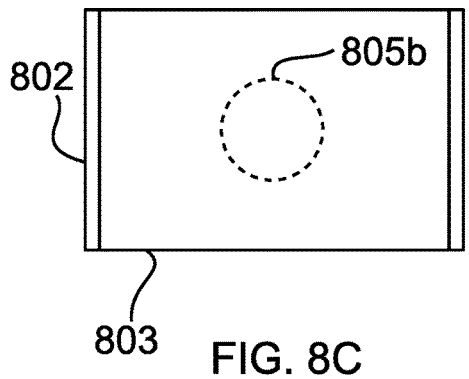
Figure 8D:
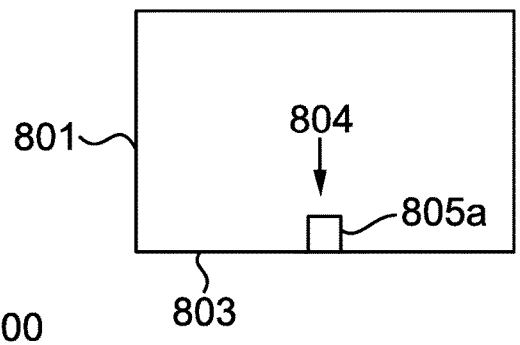
Figure 8E:
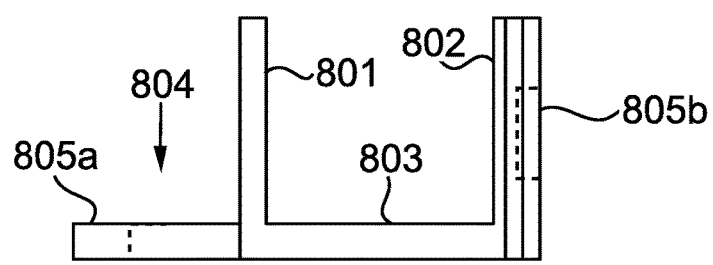

FIGS. 8B-E depict various other views of disk 800. FIG. 8B is a top view of disk 800. FIG. 8C is a front view of disk 800. FIG. 8D is a back view of disk 800. FIG. 8E is a side view of disk 800.

Figure 9:
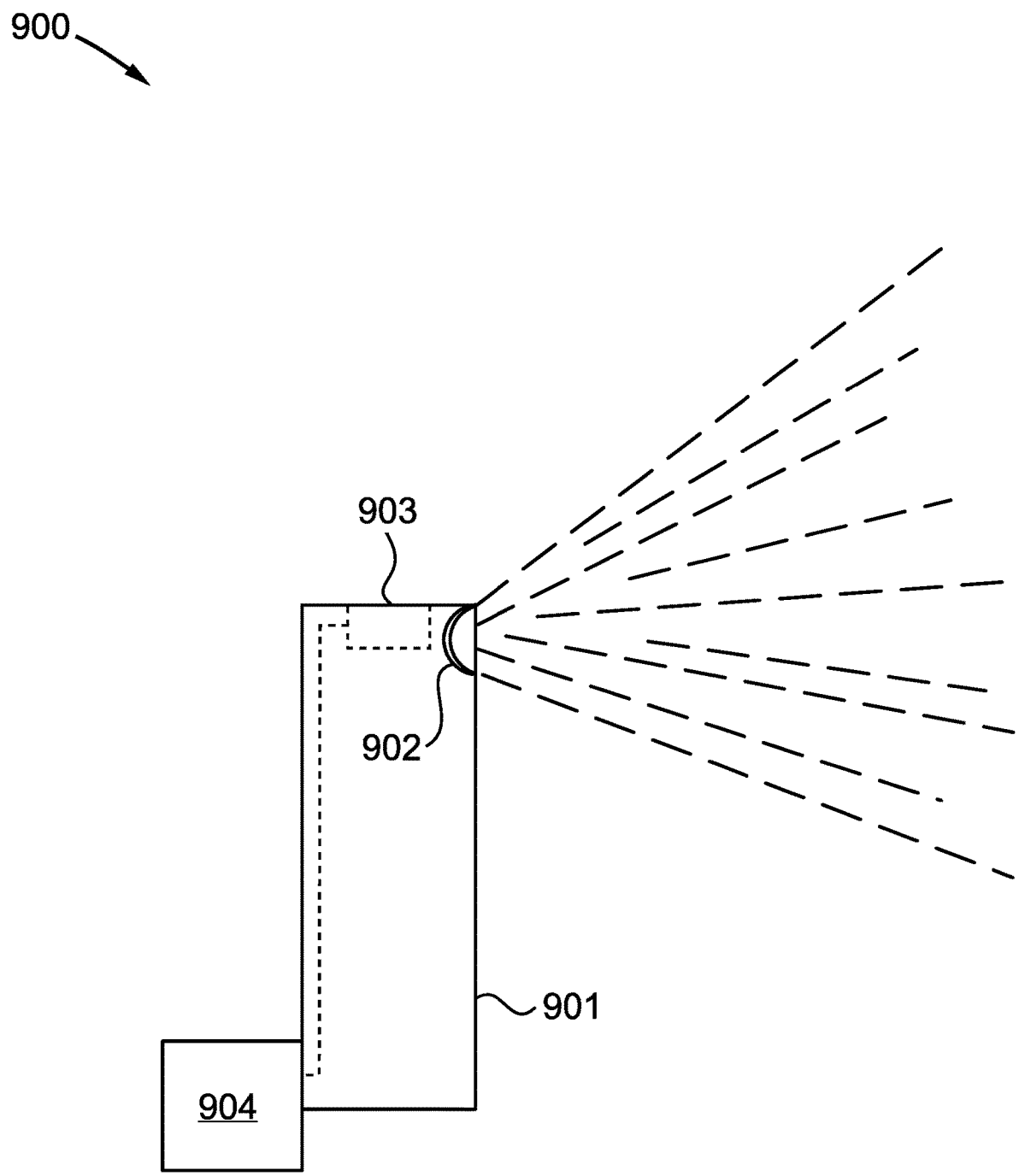
FIG. 9 depicts an embodiment of a fluid dispersal node having a microphone.

FIG. 9 depicts an embodiment of a fluid dispersal node having a microphone. Node 900 includes riser 901, nozzle 902, microphone 903, and controller 904. Microphone 903 is electrically coupled to controller 904, and controller 904 includes, similar to that discussed above with regard to FIG. 1, one or more hardware processors and memory. The memory stores instruction for operating node 900 based on voice commands received by microphone 903.

Microphone 903 is any of a variety of off-the-shelf microphones, such as those including a diaphragm and transducer. In some embodiments, microphone 903 is placed beneath a small opening in riser 901 to allow sound to pass to the diaphragm. Additionally, in some embodiments, microphone includes a hydrophobic mesh place over microphone 903 that reduces an amount of water that collects on the diaphragm. In any embodiment, microphone 903 is fluid-tight to prevent exposure of the transducer to any fluid.

Microphone 903 is coupled to controller 904 via any of a variety of standard wired and/or wireless means. The memory stores instructions for translating electronic signals passed from microphone 903 to controller 904 into commands, which are in turn executed by the processors. For example, in one embodiment, the memory stores instructions to test a sprinkler head upon receiving a vocal command from a user. In some embodiments, the memory additionally includes instructions for filtering out background noise, such as noise created by a fluid spray, and/or sound distortions caused by fluid accumulation on and/or around microphone 903.

Figure 10:
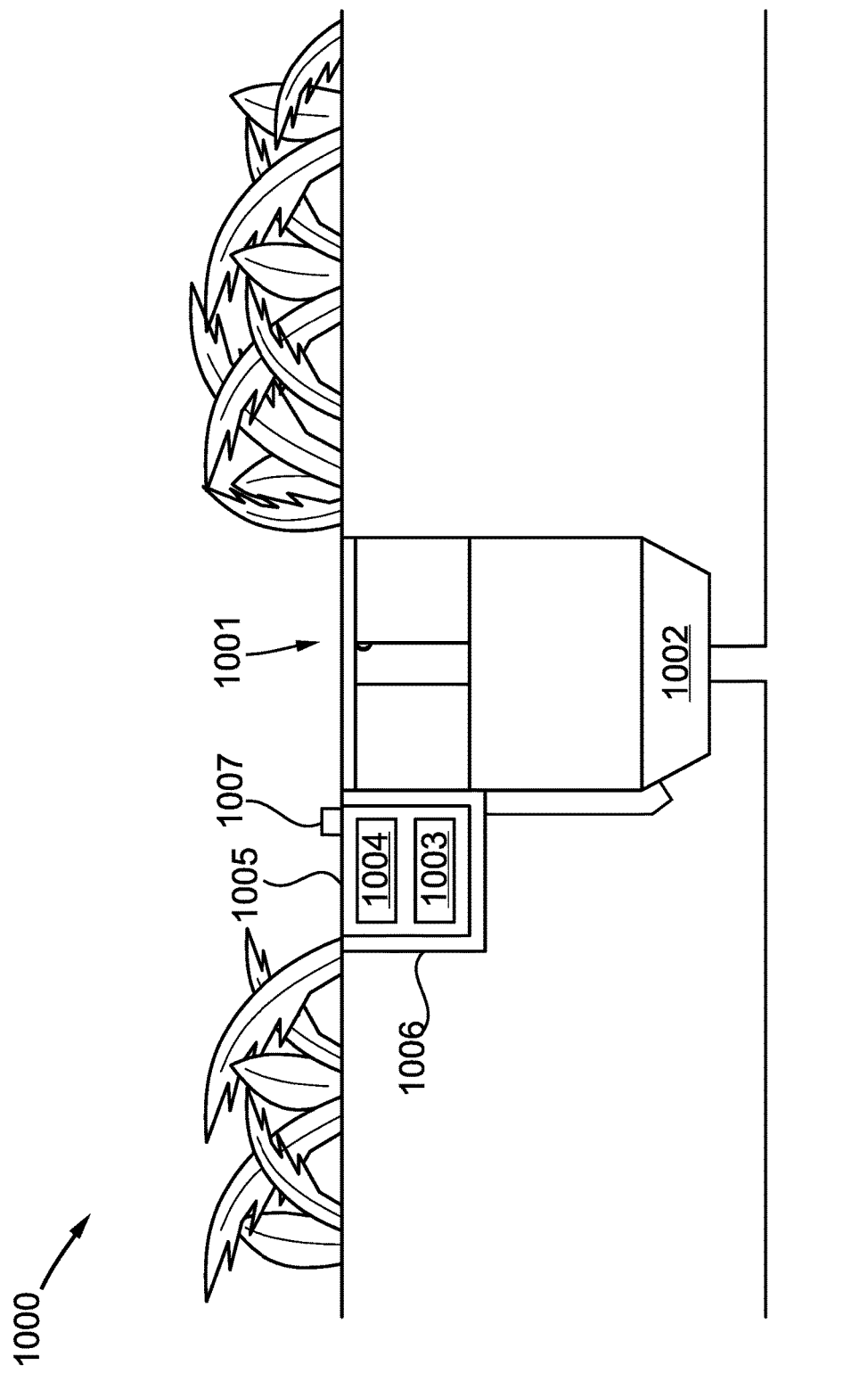
FIG. 10 depicts an embodiment of a fluid dispersal node having a removable electronics enclosure.

FIG. 10 depicts an embodiment of a fluid dispersal node having a removable electronics enclosure. Node 1000 includes nozzle 1001, electromechanical valve 1002, controller 1003, hardware wireless communication module 1004, removable enclosure 1005, enclosure mount 1006, and release button 1007. Enclosure 1005 is removably disposed in enclosure mount 1006. Pressing button 1007 disengages enclosure 1005 from mount 1006.

Node 1000, nozzle 1001, valve 1002, controller 1003, wireless module 1004, and enclosure 1005 are similar to those described above with regard to FIGS. 1-3 and 6A-8E. However, in some embodiments, enclosure 1005 additionally includes electrical contacts on an outside surface of enclosure 1005 that electrically couple enclosure 1005 to mount 1006. Mount 1006 has a shape similar to enclosure 1005 and forms a fluid-tight seal with enclosure 1005. Additionally, mount 1006 includes electrical contacts that electrically couple mount 1006 to enclosure 1005. In some embodiments, mount 1006 includes a gasket that presses against exterior walls of enclosure 1005. In other embodiments, mount 1006 includes a lid and gasket that seal mount 1006.

Figure 11:
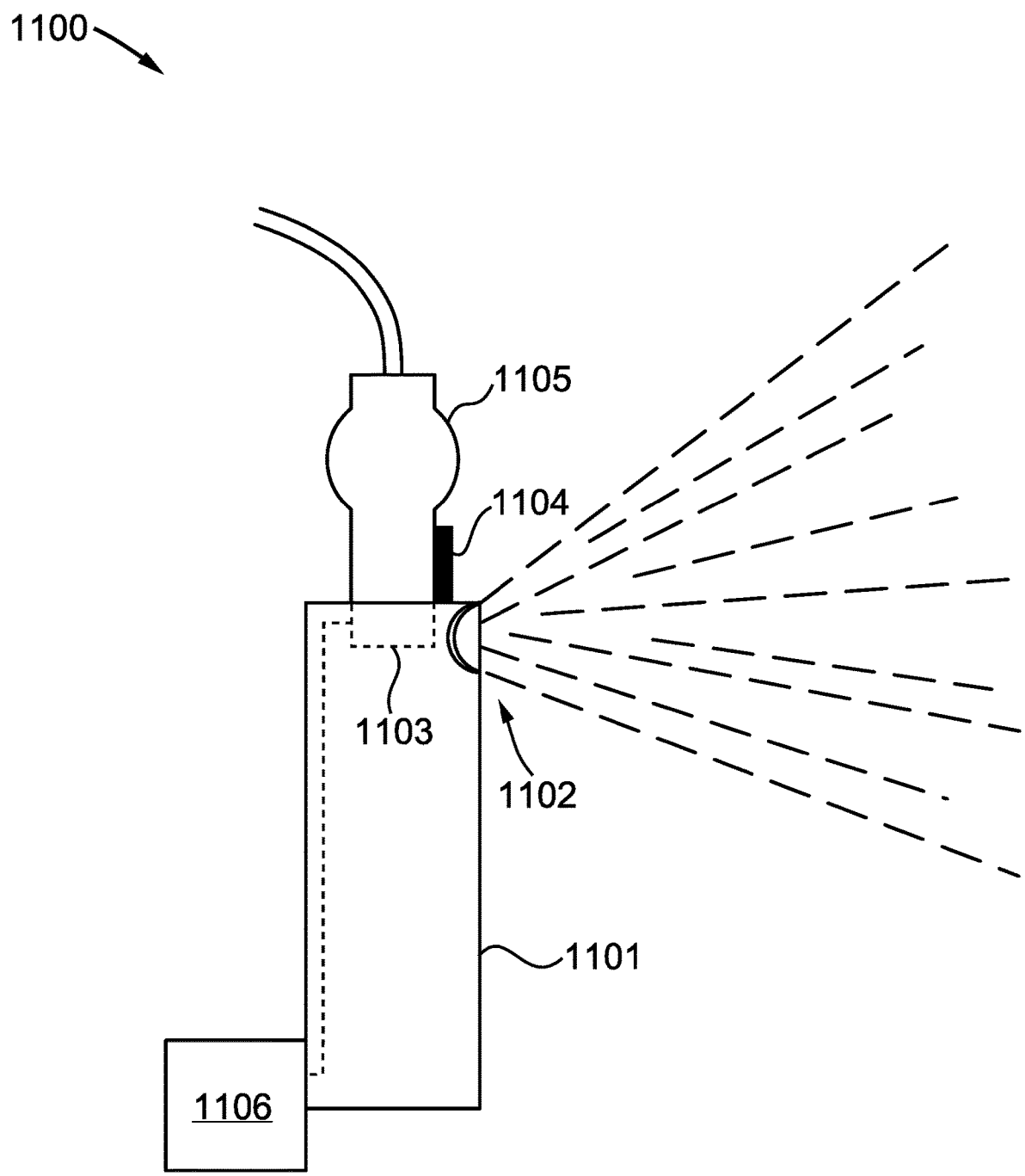
FIG. 11 depicts an embodiment of a fluid dispersal node having a USB port.

FIG. 11 depicts an embodiment of a fluid dispersal node having a USB port. Node 1100 includes riser 1101, nozzle 1102, USB port 1103, fluid-tight covering 1104, USB connector 1105, and controller 1106. USB port 1103 is electrically coupled to controller 1106, which includes one or more hardware processors and hardware memory, similar to that described with regard to FIG. 1. Additionally, though not depicted, node 1100 includes a hardware wireless communication module similar to that described with regard to FIGS. 1-2.

When USB connector 1105 is not inserted into USB port 1103, fluid-tight covering 1104 seals USB port 1103 to prevent fluid damage to USB port 1103. USB port 1103 is useful for programming controller 1106 and/or communicating with controller 1106 when a hardware wireless communication module associated with node 1100 (such as that described with regard to FIG. 1) fails. Additionally, USB port 1103 is useful for instances when a high amount of data needs to be transferred to and/or from node 1100 at speeds not achievable via the wireless module. Those of skill in the art recognize other benefits of having a removable wired connection to node 1100 in addition to a wireless network connection.

Figure 12B:
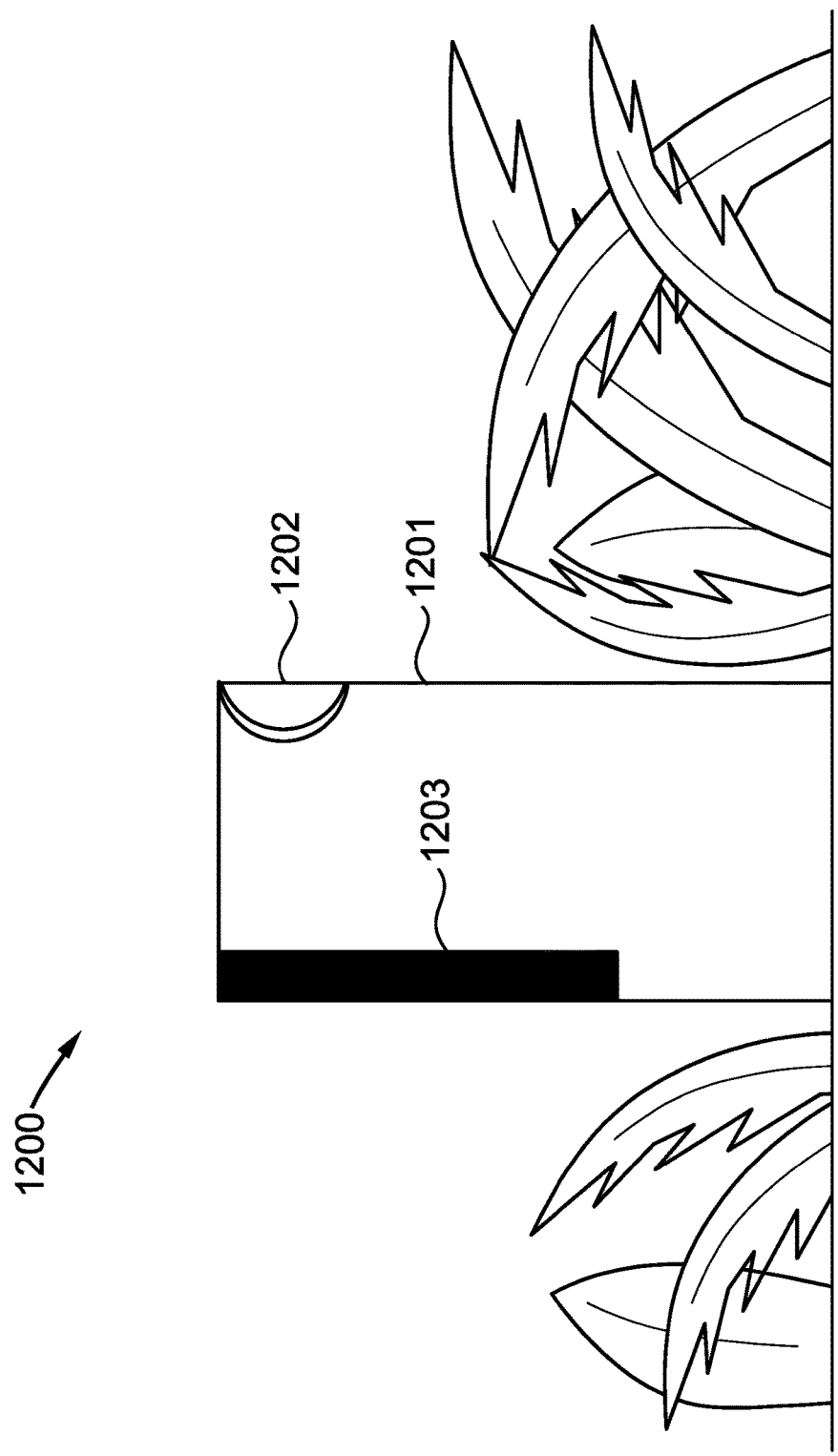
Figure 12C:
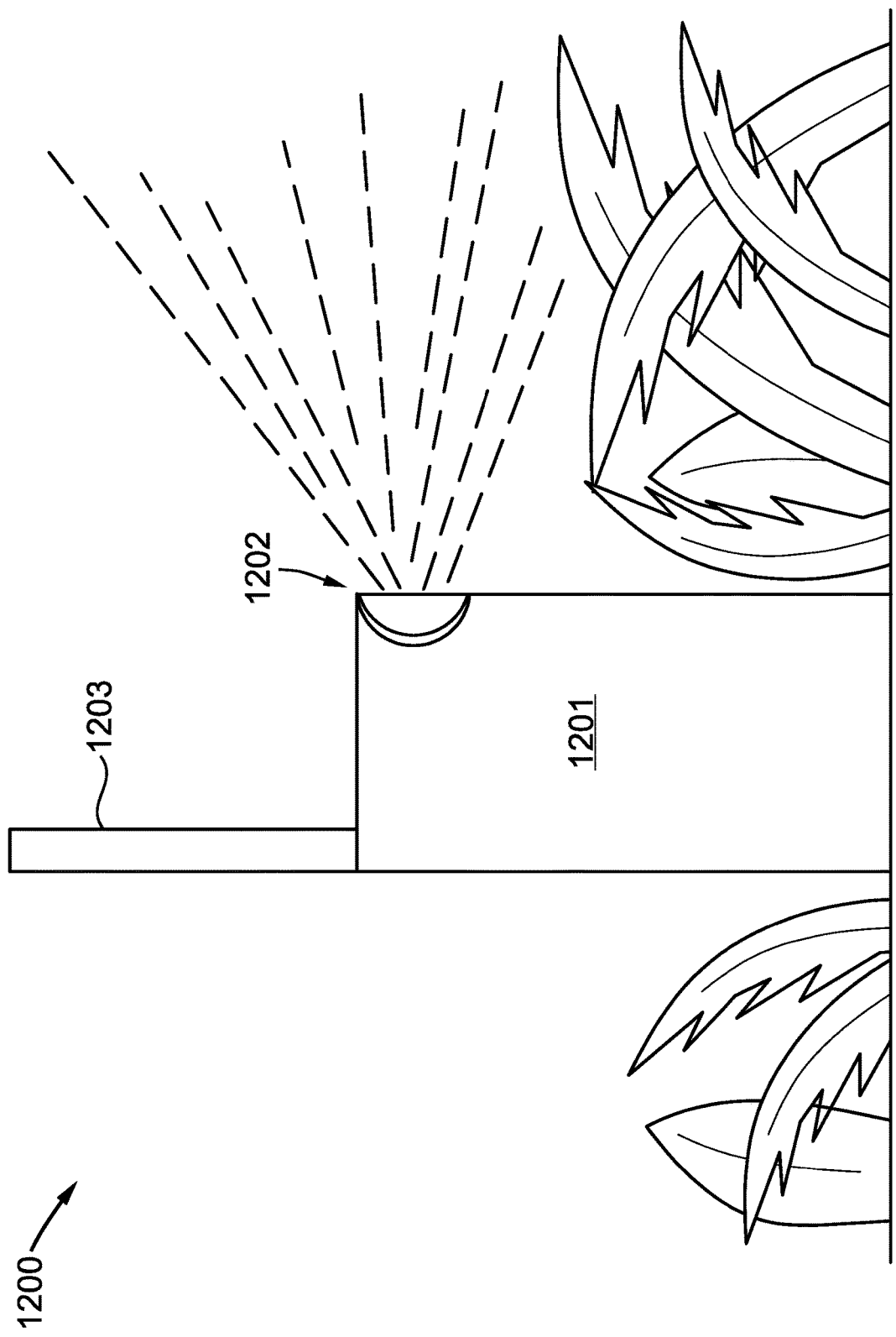

FIGS. 12A-C depict an embodiment of a fluid dispersal node having an antenna disposed in a node riser. As depicted, node 1200 includes riser 1201, nozzle 1202 disposed on riser 1201, and antenna 1203 also disposed on riser 1201. Additionally, though not depicted, FIGS. 12A-C incorporate by reference some elements depicted in FIG. 1, including electromechanical valve 102, hardware controller 103, hardware wireless communication module 104a, and fluid-tight, RF-transparent enclosure 105. The structure, function, and arrangement of the elements incorporated by reference are thus similar to that described with regard to FIG. 1. However, as depicted in FIGS. 12A-C, antenna 1203 is disposed outside RF-transparent enclosure 105. Some embodiments do not include RF-transparent enclosure 105, and rather include a standard, fluid-tight enclosure that houses controller 103 and/or wireless module 104a. In some embodiments, antenna 1203 includes a separate RF-transparent enclosure. One of skill in the art readily recognizes how to modify the elements as described with regard to FIG. 1 to function with the embodiment described with regard to FIGS. 12A-C. For example, antenna 1203 must be coupled to wireless module 104a in a way that prevents fluid from coming in contact with electrical components. One way is to additionally enclose elements that couple antenna 1203 to wireless module 104a in fluid-tight housing.

As depicted, in some embodiments, antenna 1203 is positioned along riser 1201 on a side opposite nozzle 1202. Additionally, in the same or other embodiments, antenna 1203 is positioned within riser 1201, and deploys above riser 1201 as riser 1201 deploys. In some embodiments, this is accomplished using fluid pressure. As valve 102 opens and allows fluid into riser 1201, riser 1201 and antenna 1203 extend.

Figure 13:
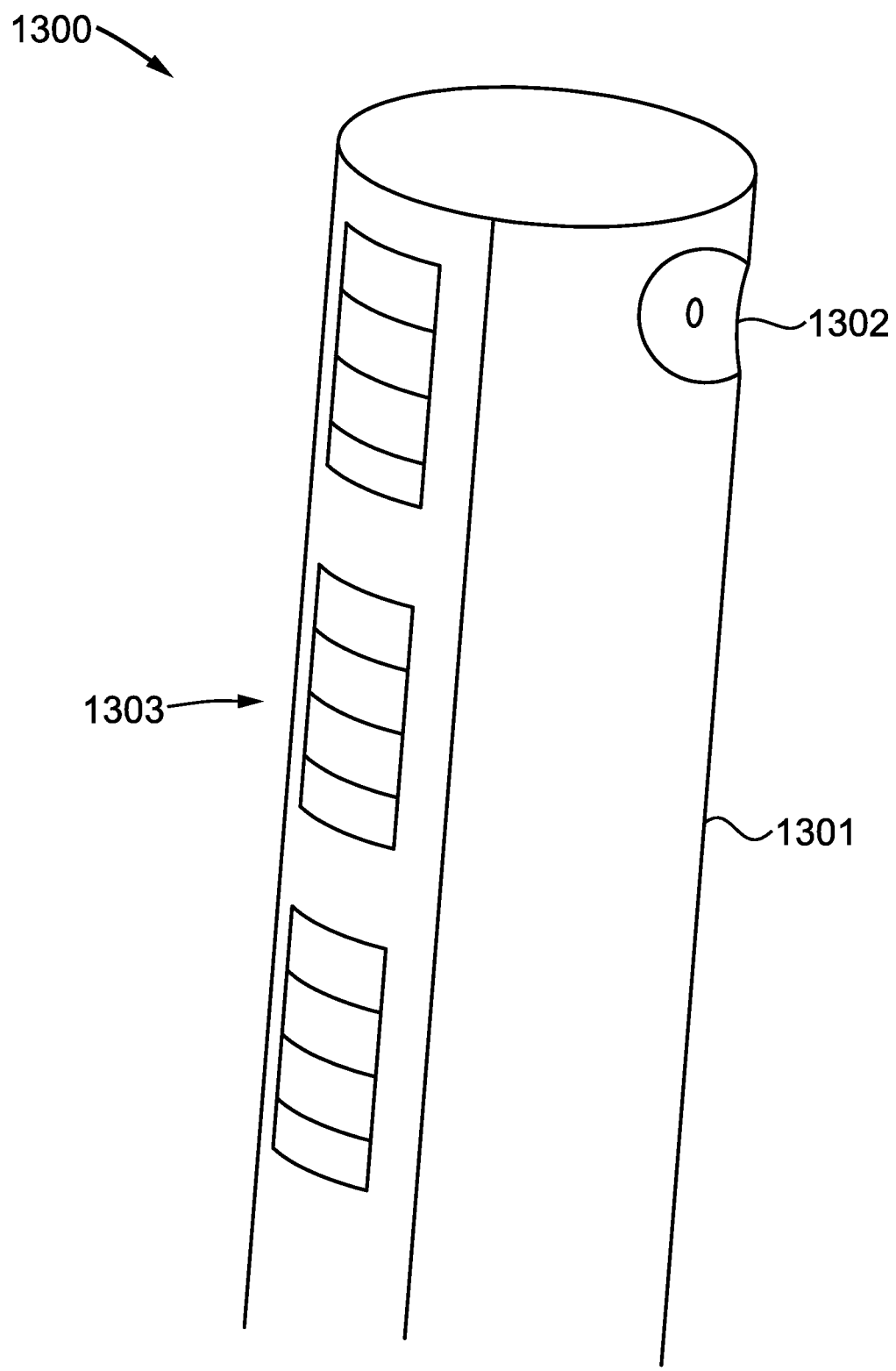
FIG. 13 depicts an embodiment of a fluid dispersal node including solar cells, according to the claimed invention.

FIG. 13 depicts an embodiment of a fluid dispersal node including solar cells. Node 1300, which is similar to node 100 described above with regard to FIG. 1, includes riser 1301, nozzle 1302, and solar cells 1303. Though several solar cells are depicted, in some embodiments, node 1300 includes only one solar cell 1303. Riser 1301 is a fluid-pressure-activated sprinkler head that deploys when fluid pressure inside riser 1301 reaches a minimum threshold. For example, in one embodiment, node 1300 is a sprinkler head, and riser 1301 is set within the ground. As an electromechanical valve (similar to that described with regard to FIGS. 1 and 6A-8E) opens, fluid flows into riser 1301, forcing riser 1301 out of the ground. Solar cells 1303 are positioned around riser 1301, and thus deploy as riser 1301 deploys. Solar cells 1303 charge a battery (such as that described with regard to FIGS. 4A-5) that powers one or more hardware processors, hardware memory, a hardware wireless communication module, and the valve (all similar to those described with regard to FIGS. 1-2 and 6A-8E).

Figure 14A:
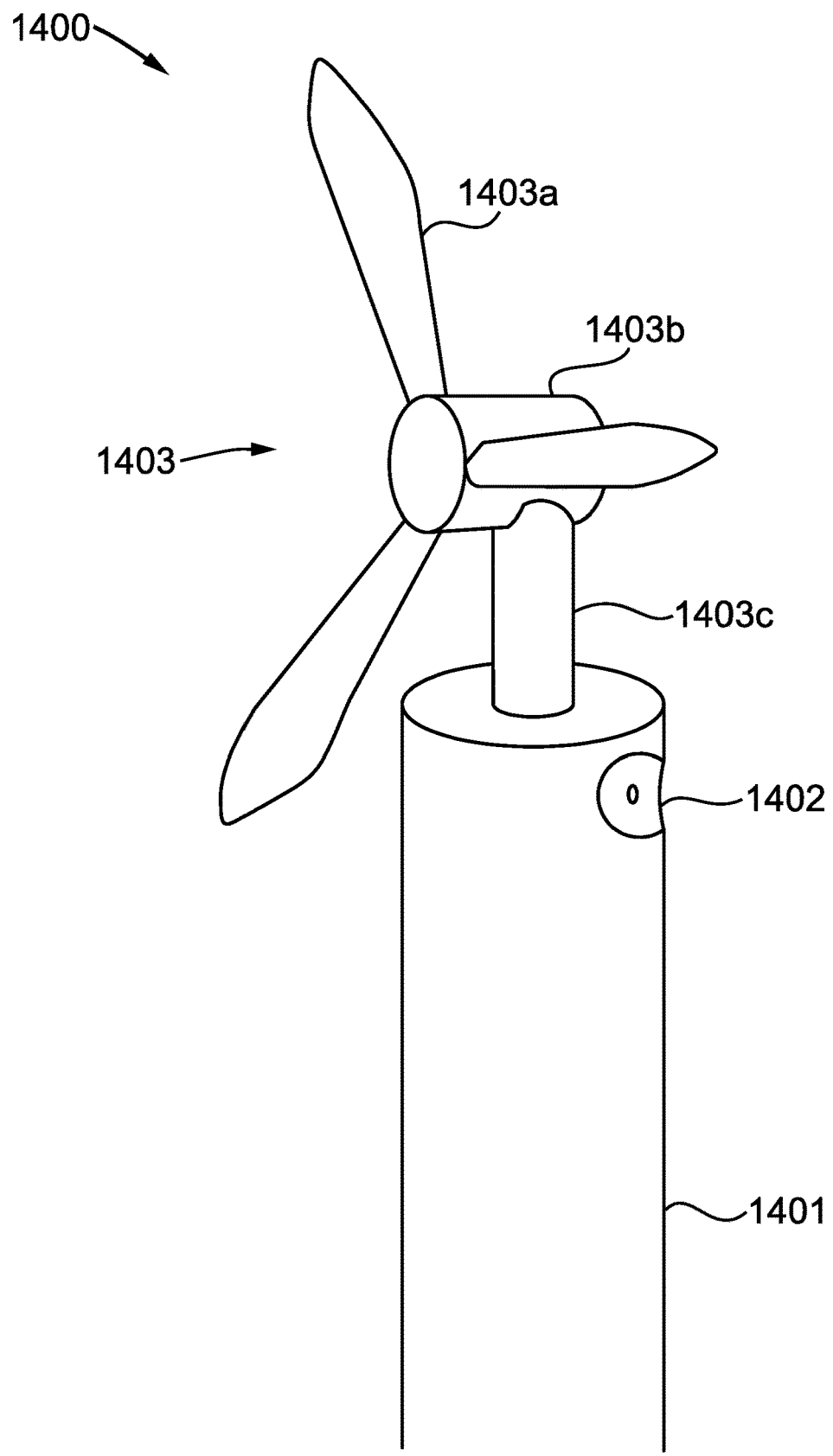

FIGS. 14A-B depict an embodiment of a fluid dispersal node similar to that depicted in FIG. 13, instead including a miniature wind turbine. Node 1400 includes riser 1401, nozzle 1402, and turbine 1403. Turbine 1403, in turn, includes blades 1403a, electromagnet 1403b, and stand 1403c. Riser 1401 is fluid-deployed, similar to riser 1301, and turbine 1403 is similarly fluid-pressure-deployed. As depicted in FIG. 14B, when riser 1401 is not deployed, stand 1403c slides into riser 1401 such that turbine 1403 is at or below ground-level, and blades 1403a fold back over electromagnet 1403b. When deployed, turbine 1403 is rotatable to align with a direction of wind. Blades 1403a are tilted and cause electromagnet 1403b to rotate, charging a battery associated with node 1400. The battery powers one or more hardware processors, hardware memory, a hardware wireless communication module, an electromagnetic valve, or combinations thereof.

Figure 15:
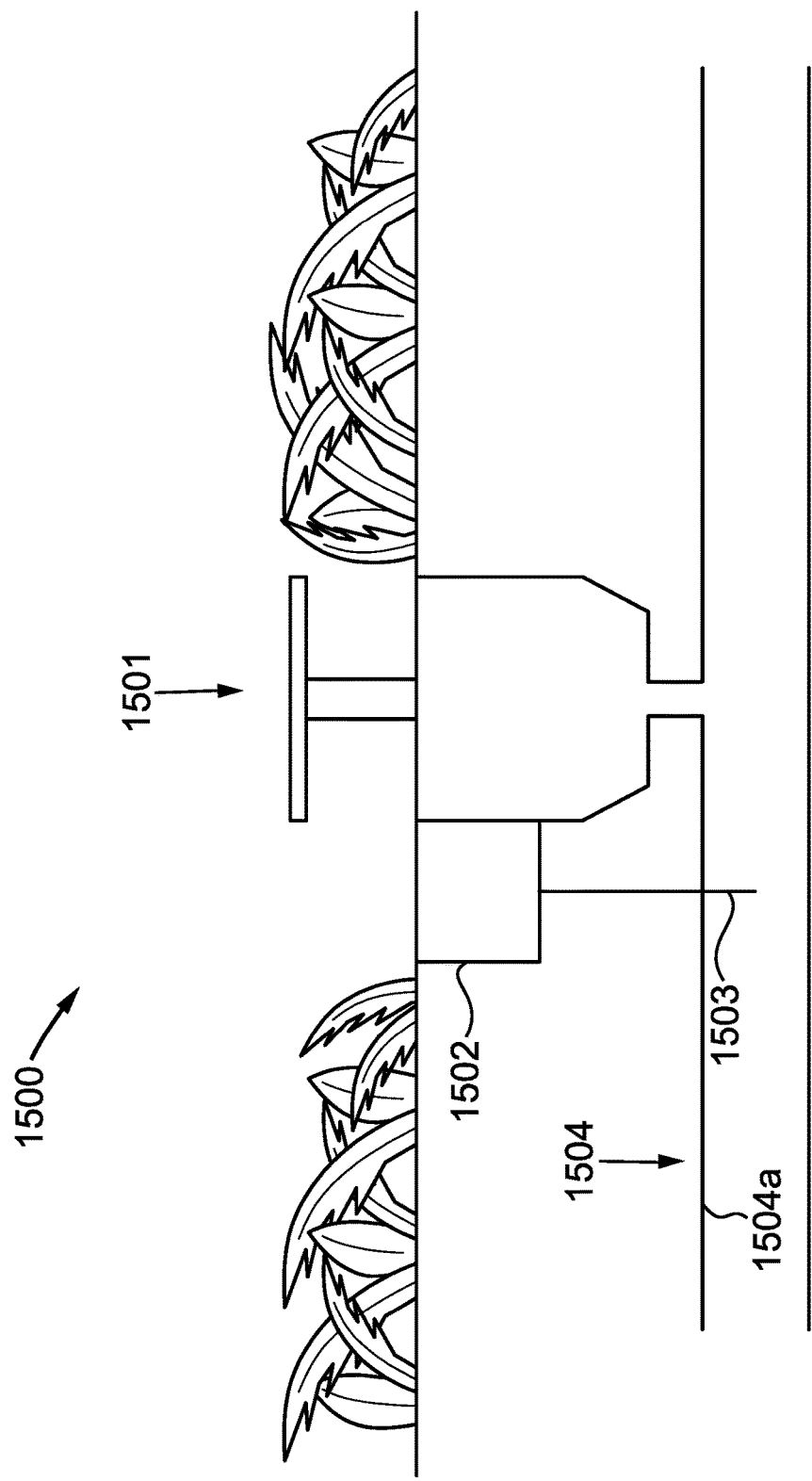
FIG. 15 depicts an embodiment of a fluid dispersal node with an antenna disposed in a fluid line connected to the node.

FIG. 15 depicts an embodiment of a fluid dispersal node with an antenna disposed in a fluid line connected to the node. Node 1500 includes head 1501, electronics 1502, antenna 1503, and fluid supply line 1504. Additionally, though not depicted, FIG. 15 incorporates by reference some elements depicted in FIG. 1, including electromechanical valve 102, hardware controller 103, hardware wireless communication module 104a, and fluid-tight, RF-transparent enclosure 105. For example, in some embodiments, electronics 1502 includes hardware controller 103 and wireless module 104a. The structure, function, and arrangement of the elements incorporated by reference are thus similar to that described with regard to FIG. 1. However, as depicted in FIG. 15, antenna 1503 is disposed outside RF-transparent enclosure 105. Some embodiments do not include RF-transparent enclosure 105, and rather include a standard, fluid-tight enclosure.

Antenna 1503 is disposed in fluid supply line 1504 and coupled to electronics 1502 and/or directly to wireless module 104a. In some embodiments, interior surface 1504a of fluid supply line 1504 is coated with a material reflective to electromagnetic radiation. Fluid supply line 1504 thus is a waveguide. Fluid supply line 1504 is useful, for example, in reducing RF noise, and in isolating RF signals received by antenna 1503.

The invention claimed is:

1. A fluid dispersal node comprising:
a fluid outlet;
an electromechanical valve disposed in the node, wherein the valve controls fluid flow to the fluid outlet, and wherein the electromechanical valve comprises:
a hollow cylindrical pipe comprising:
a first and a second chamber, and
a partial wall separating the first and second chambers,
a u-shaped disk around the partial wall, wherein the u-shaped disk comprises:
a first side wall positioned in the first chamber,
a second side wall positioned in the second chamber,
a bottom wall between, and coupling, the first and second side walls, wherein the bottom wall is in fluid-tight contact with at least a portion of an interior wall of the pipe, and
a protrusion extending from the first side wall having a width less than an internal diameter of the pipe, wherein, as the valve is closed, the first side wall is in fluid-tight contact with the partial wall and the second side wall is in fluid-tight contact with the interior wall, and wherein, as the valve is opened, the protrusion is in contact with the interior wall;
a processor and a memory, wherein the memory stores instructions that, when executed by the processor, control the electromechanical valve;
a hardware wireless communication module, wherein the wireless module receives instructions for operating the electromechanical valve and forwards those instructions to the processor and/or the memory;
an antenna electrically coupled to the wireless module; and a fluid-tight, radio frequency (RF) transparent enclosure, wherein the processor, memory, wireless module and antenna are disposed within the RF-transparent enclosure.

2. The fluid dispersal node of claim 1, wherein the fluid-tight, RF transparent enclosure has a dissipation factor ranging from 0.001 to 0.0001.

3. The fluid dispersal node of claim 1, wherein the enclosure comprises at least one of uncured butyl rubber, aluminum oxide, magnesium oxide, beryllium oxide, cross-linked polystyrene, polyethylene, polypropylene, Teflon, fused quartz, fused silica, and boron nitride.

4. The fluid dispersal node of claim 1, wherein the fluid dispersal node is a sprinkler head, and wherein the fluid outlet comprises a nozzle.

5. The fluid dispersal node of claim 4, wherein the nozzle comprises:
a plurality of nozzle shapes; and
an electric motor coupled to the nozzle that directs the fluid flow through the plurality of nozzle shapes, wherein the electric motor is controlled by the processor and/or the memory.

6. The fluid dispersal node of claim 4, further comprising a turbine positioned in front of the nozzle that spreads the fluid flow flowing from the nozzle and rotates, charging a battery that powers one or more of the electromechanical valve, the processor, the memory, and the wireless module.

7. The fluid dispersal node of claim 1, wherein the fluid dispersal node is an impact rotor sprinkler, and wherein an impact arm of the sprinkler drives an electromagnet and charges a battery that powers one or more of the processor, the memory, the wireless module, and the electromagnetic valve.

8. The fluid dispersal node of claim 1, wherein the electromechanical valve comprises one or more electromagnets and one or more magnets, wherein the magnets comprise permanent magnets, ferromagnets, or a combination thereof.

9. The fluid dispersal node of claim 8, wherein a first magnet is disposed in the protrusion and a second magnet is disposed in the second side wall.

10. The fluid dispersal node of claim 1, further comprising a microphone coupled to the processor and/or the memory, wherein the memory stores instructions for operating the node based on voice commands received by the microphone.

11. The fluid dispersal node of claim 1, wherein the fluid-tight, RF transparent enclosure is removably disposed in the fluid dispersal node.

12. The fluid dispersal node of claim 1, further comprising a USB port with a fluid-tight covering, wherein the USB port is coupled to the processor and/or the memory.

* * * * *